(12) United States Patent
Moriyama

(10) Patent No.: US 6,779,831 B2
(45) Date of Patent: Aug. 24, 2004

(54) DOOR STRUCTURE FOR VEHICLE

(75) Inventor: Yukihiro Moriyama, Hiroshima-ken (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 10/667,858

(22) Filed: Sep. 23, 2003

(65) Prior Publication Data

US 2004/0056509 A1 Mar. 25, 2004

Related U.S. Application Data

(63) Continuation of application No. 10/178,928, filed on Jun. 25, 2002, now Pat. No. 6,659,537.

(30) Foreign Application Priority Data

| Jul. 4, 2001 | (JP) | ........................................ | 2001-203835 |
| Jul. 18, 2001 | (JP) | ........................................ | 2001-217753 |
| Jul. 18, 2001 | (JP) | ........................................ | 2001-217754 |

(51) Int. Cl.[7] ................................................ B60J 10/08

(52) U.S. Cl. ................................ 296/146.9; 296/146.11; 296/146.12; 296/146.6

(58) Field of Search ........................ 296/146.9, 146.11, 296/146.12, 146.6; 292/336.3; 49/366

(56) References Cited

U.S. PATENT DOCUMENTS

| 4,013,317 | A | | 3/1977 | Reidelbach et al. ..... 296/146.6 |
| 4,307,911 | A | | 12/1981 | Pavlik ...................... 296/146.6 |
| 4,434,580 | A | | 3/1984 | Engelsberger et al. ... 296/146.6 |
| 4,930,836 | A | * | 6/1990 | Grinn .................... 296/146.11 |
| 5,137,325 | A | | 8/1992 | Ohya ...................... 296/146.6 |
| 5,228,741 | A | | 7/1993 | Ide .............................. 296/188 |
| 5,470,125 | A | | 11/1995 | Yamazaki ................ 296/146.6 |
| 5,491,875 | A | * | 2/1996 | Siladke et al. ......... 296/146.12 |
| 5,599,057 | A | | 2/1997 | Hirahara et al. ......... 296/146.6 |
| 5,749,611 | A | * | 5/1998 | Watson et al. ........... 292/336.3 |
| 5,752,737 | A | | 5/1998 | Heldt et al. .............. 296/146.6 |
| 5,800,007 | A | | 9/1998 | Cho |
| 5,908,216 | A | | 6/1999 | Townsend ................ 296/146.6 |
| 6,020,039 | A | | 2/2000 | Cline et al. .............. 296/146.6 |

(List continued on next page.)

FOREIGN PATENT DOCUMENTS

| DE | 38 10 762 | | 10/1989 |
| JP | 56-39920 | | 4/1981 |
| JP | 57 41209 | | 3/1982 |
| JP | 2-20423 | | 1/1990 |
| JP | 6-40259 | | 2/1994 |
| JP | 7-267003 | | 10/1995 |
| JP | 10-250370 | | 9/1998 |
| JP | 2000 280744 | | 10/2000 |
| JP | 2000-280744 | | 10/2000 |
| JP | 2000280744 | * | 10/2000 |
| JP | 200127067 | * | 1/2001 |
| JP | 2002 103970 | | 4/2002 |
| JP | 2002104239 | * | 4/2002 |
| JP | 2002 104239 | | 4/2002 |
| JP | 2002106230 | * | 4/2002 |
| JP | 2002178755 | * | 6/2002 |
| JP | 2002 178755 | | 6/2002 |
| JP | 2003267052 | * | 9/2003 |

*Primary Examiner*—Kiran Patel

(57) ABSTRACT

One large opening (1) formed in a car body side portion and continuous in a back-and-forth direction is opened and closed by front and rear side doors (11, 12). When the side doors (11, 12) are closed, a lap portion (15) is formed where a rear end of the front side door (11) overlaps a front end of the rear side door (12) externally in a direction of car width. A reinforcing member (25) extending in a vertical direction is disposed on the rear side door (12) in the vicinity of the lap portion (15). The rear end of a front impact bar (27) disposed in the front side door (11) extends to the lap portion (15). The front end of a rear impact bar (26) disposed in the rear side door (12) is connected to the reinforcing member (25).

9 Claims, 20 Drawing Sheets

U.S. PATENT DOCUMENTS

| | | | |
|---|---|---|---|
| 6,053,561 A | 4/2000 | Hojnowski et al. | 296/146.9 |
| 6,135,537 A | 10/2000 | Giddons | 296/146.6 |
| 6,220,652 B1 | 4/2001 | Browne et al. | 296/146.6 |
| 6,234,565 B1 * | 5/2001 | Bryant et al. | 296/146.11 |
| 6,302,474 B1 | 10/2001 | Drysdale et al. | 295/146.6 |
| 6,332,641 B1 * | 12/2001 | Okana | 296/146.9 |
| 6,382,705 B1 | 5/2002 | Lang et al. | 296/146.12 |
| 6,609,748 B1 * | 8/2003 | Azzouz et al. | 296/146.11 |
| 6,641,205 B1 * | 11/2003 | Russell et al. | 296/146.9 |
| 6,659,537 B2 * | 12/2003 | Moriyama et al. | 296/146.12 |
| 6,694,676 B2 * | 2/2004 | Sakamoto et al. | 49/366 |
| 2002/0073623 A1 | 6/2002 | Sakamoto et al. | 49/366 |
| 2003/0006625 A1 * | 1/2003 | Moriyama et al. | 296/146.6 |
| 2003/0160476 A1 * | 8/2003 | Moriyama | 296/146.6 |

* cited by examiner

DOOR STRUCTURE FOR VEHICLE

This application is a continuation of U.S. application Ser. No. 10/178,928, filed Jun. 25, 2002, now U.S. Pat. No. 6,659,537.

FIELD OF THE INVENTION

This application is based upon and claims priority of Japanese patent application nos. 2001-203835, filed Jul. 4, 2001, and 2001-217754 and 2001-217753 filed Jul. 18, 2001, the contents being incorporated herein by reference.

The present invention relates to a door structure for a vehicle.

BACKGROUND OF THE INVENTION

A car body side portion has a passenger entrance/exit opening opened and closed by a side door. The side door mostly has a front side door for the front seat and a rear side door for the rear seat. In some cases, the opening opened and closed by the front and rear side doors does not have a so-called center pillar and accordingly forms one large opening continuous in the car body back-and-forth direction (e.g., see Japanese Patent Laid-Open No. 2-20423).

Japanese Patent Laid-Open No. 2-20423 (U.S. Pat. No. 4,930,836) discloses a door structure in which the front side door opens backward and the rear side door opens forward. A structure in which the rear end of a front side door in a closed state overlaps the front end of a rear side door in a closed state to cover it externally in the direction of car body width, that is, a door structure in which the rear side door can be opened provided that the front side door is opened, is also disclosed. This door structure is employed in small trucks having a large car body strength.

Recently, in order to improve safety in case of side collision where the car body is collided at the side, techniques for preventing the side door from being largely displaced internally in the direction of car body width, i.e., into the car compartment, are often employed. As such technique for regulating large displacement of the side door into the car compartment in the case of side collision, one called a catcher pin structure is available (e.g., see Japanese Patent Laid-Open No. 6-40259). According to this structure, a projection serving as an engaging portion is formed on either one of the side door and car body, and a hole serving as an engaging target portion to engage with the projection is formed in the other one of the side door and car body. When side collision occurs, the engaging portion and the engaging target portion engage with each other so the side door engages with the car body better.

More specifically, according to Japanese Patent Laid-Open No. 6-40259, an engaging pin projects backward from the rear end of a rear door, and the corner of the periphery of the wheel housing of the rear fender is reinforced by a reinforcement. An engaging pin 10 and an engaging hole are formed at this corner. The engaging hole engages with the engaging pin 10 so that the movement of the rear end of the rear door forward and toward the car compartment is regulated. The lower end of the reinforcement is connected to the side sill.

An impact bar is sometimes disposed in the side door to extend in the back-and-forth direction of the car body, in order that deformation of the side door itself is prevented as much as possible (e.g., see Japanese Patent Laid-Open No. 10-250370).

More specifically, according to Japanese Patent Laid-Open No. 10-250370, impact bars are provided to the lower portion and upper end, respectively, in the door main body. The lower impact bar corresponding to the height of the fender is arranged on the outer side in the direction of thickness of the door with respect to the upper impact bar, and is inclined downward to the back.

In a passenger car-type vehicle, it has been discussed to employ a structure in which an opening in a car body side portion, which is opened and closed by front and side rear doors, forms one large opening continuous in the back-and-forth direction. A passenger car, however, does not often have a sufficiently large car body strength when compared to a truck, and it is important how to prevent or reduce effectively a large deformation of a side door into the car compartment in the case of side collision. Particularly, when a high-rigidity vehicle side member such as a center pillar does not exist, it is preferable to improve the rigidity of the front and rear side doors in the vicinity of their boundary.

SUMMARY OF THE INVENTION

The present invention has been made in consideration of the above situation, and has as its object to provide a door structure for a vehicle, in which when a door is open, a large partition-less opening can be formed in a car body side portion, while the strength of the car body side portion can be ensured against an impact applied to the car body side portion in case of side collision or the like.

It is another object of the present invention to provide a door structure for a vehicle, in which when an opening opened and closed by front and rear side doors is continuous in the back-and-forth direction, the rigidity of the front door, particularly the rigidity of the front and rear side doors in the vicinity of their boundary, is increased, so deformation into the car compartment can be prevented or reduced effectively.

In order to achieve the above objects, a door structure for a vehicle according to the present invention has the following arrangement. More specifically, there is provided a door structure for a vehicle, in which one opening (1) formed in a car body side portion and continuous in a back-and-forth direction is opened and closed by a front side door (11) and rear side door (12), and which has a lap portion (15) where a rear end of the front side door (11) and a front end of the rear side door (12) overlap each other in a direction of car width when the front and rear side doors (11, 12) are closed, wherein at the lap portion (15), the rear end of the front side door (11) overlaps the front end of the rear side door (12) to be located on an outer side in the direction of car width with respect to the front end of the rear side door (12), a front impact bar (27) extending in the back-and-forth direction of the car body is disposed in the front side door (11), and a rear end of the front impact bar (27) extends to the lap portion (15).

According the above arrangement, when side collision occurs, the front impact bar itself prevents or reduces deformation of the front side door toward the car compartment. In addition, the rear end of the front impact bar extends to the overlapping portion with the rear side door, that is, to a high-rigidity portion. Thus, a large deformation of the front side door into the car compartment is further prevented or reduced while the rigidity of the front and rear side doors in the vicinity of their boundary is increased.

With the above arrangement as a premise, a door structure for a vehicle according to the present invention has the following arrangement. More specifically, a reinforcing member (25) is disposed in the front end of the rear side door (12) to extend in a vertical direction, a rear impact bar (26) is disposed in the rear side door (12) to extend in the back-and-forth direction, and a front end of the rear impact bar (26) extends to the reinforcing member (25).

According the above arrangement, when side collision occurs, the rear impact bar itself prevents or reduces large deformation of the rear side door toward the car compartment. In addition to an increase in rigidity of the lap portion, the front end of the rear impact bar extends to the high-rigidity reinforcing portion. Thus, a large deformation of the rear side door into the car compartment is further prevented or reduced.

With the above arrangement as a premise, a door structure for a vehicle according to the present invention has the following arrangement. More specifically, the rear end of the front impact bar (27) and the front end of the rear impact bar (26) extend to the lap portion (15) or to a portion in the vicinity of the lap portion (15) to be close to each other.

According to the above arrangement, the front and rear impact bars can be disposed close to each other, that is, the rigidity of the front and rear side doors in the vicinity of their boundary is increased, and a side-colliding force is received by both the front and rear impact bars as much as possible. Thus, a large deformation of the side door into the car compartment can be prevented or reduced.

With the above arrangement as a premise, a door structure for a vehicle according to the present invention has the following arrangement. More specifically, the reinforcing member (25) forms a closed section, and the front end of the impact bar (26) is bonded to that portion of the reinforcing member (25) which forms the closed section, to abut against it externally in the direction of car width.

According to the above arrangement, an external force acting on the rear impact bar in the case of side collision is received by the reinforcing member as well. Thus, deformation of the side door, particularly of the rear side door, into the car compartment can be prevented further effectively.

With the above arrangement as a premise, a door structure for a vehicle according to the present invention has the following arrangement. More specifically, the rear end of the front impact bar (27) overlaps that portion of the reinforcing member (25) which forms the closed section in the direction of car width.

According to the above arrangement, an external force acting on the front impact bar in the case of side collision is also received by the reinforcing member. Thus, deformation of the front side door into the car compartment can be prevented or reduced further effectively.

With the above arrangement as a premise, a door structure for a vehicle according to the present invention has the following arrangement. More specifically, a reinforcing member (25) is disposed in the front end of the rear side door (12) to extend in a vertical direction to form a closed section, and the rear end of the front impact bar (27) extends to a portion in the vicinity of the reinforcing member (25).

According to the above arrangement, an external force acting on the front impact bar in the case of side collision is also received by the front end of the rear side door reinforced by the reinforcing member. Thus, deformation of the front side door into the car compartment can be prevented or reduced further effectively.

With the above arrangement as a premise, a door structure for a vehicle according to the present invention has the following arrangement. More specifically, the rear side door (12) is swung about a hinge (14) provided at a rear end thereof as a center to open forward, the front side door (11) is swung about a hinge (13) provided at a front end thereof as a center to open backward, and in an overlapping state, the front end of the rear side door (12) is covered by the rear end of the front side door (11) externally in the direction of car width, so the rear side door (12) can be opened only when the front side door (11) is open.

According to the above arrangement, the front and rear side doors form a so-called double-leafed hinged-type structure. This is preferable, when both the front and rear side doors are opened, for opening the car body side portion very large. This is also preferable in preventing the rear side door from being opened accidentally.

With the above arrangement as a premise, a door structure for a vehicle according to the present invention has the following arrangement. More specifically, in a closed state, the rear side door (12) is locked on the car body at the front end thereof, and in the closed state, the front side door (11) is locked on the front end of the rear side door (12).

According to the above embodiment, the front side door can be locked on the car body through the rear side door.

With the above arrangement as a premise, a door structure for a vehicle according to the present invention has the following arrangement. More specifically, a lower end of the opening (1) forms a side sill (2), an upper end of the opening (1) forms a side end of a roof panel (3), and in the closed state, the rear side door (12) is locked on the side sill (2) and the side end of the roof panel (3).

This arrangement is preferable to make the locking operation firm when the rear side door is to be locked on the car body with its upper and lower portions.

With the above arrangement as a premise, a door structure for a vehicle according to the present invention has the following arrangement. More specifically, a lower end of the opening (1) forms a side sill (2), that portion of the side sill (2) which is in the vicinity of the lap portion (15) forms a projection projecting partly upward, and a retractor (29) for a seat belt (28) is disposed in the projection.

This arrangement is preferable in firmly attaching the retractor to the car body, and in securing a space for attracting the retractor as well.

With the above arrangement as a premise, a door structure for a vehicle according to the present invention has the following arrangement. More specifically, the lap portion (15) of the front side door (11) or a portion in the vicinity thereof has an engaging portion (41) which engages with the car body externally in the direction of car width, when the front side door (11) is closed, to regulate the front side door (11) from being displaced inwardly in the direction of car width.

According to the above arrangement, when side collision occurs, the engaging portion engages with the car body. The position of the engaging portion is set at a high-rigidity portion, e.g., in the vicinity of the overlapping portion with the rear side door. Thus, a large displacement of the front side door into the car compartment is prevented or reduced.

With the above arrangement as a premise, a door structure for a vehicle according to the present invention has the following arrangement. More specifically, the lap portion (15) of the rear side door (12) or a portion in the vicinity thereof has an engaging portion (31) which engages with the car body externally in the direction of car width, when the rear side door (12) is closed, to regulate the rear side door (12) from being displaced inwardly in the direction of car width.

According to the above arrangement, when side collision occurs, the engaging portion engages with the car body. The position of the engaging portion is set at a high-rigidity portion, e.g., in the vicinity of the overlapping portion with the front side door. Thus, a large displacement of the rear side door into the car compartment is prevented or reduced.

With the above arrangement as a premise, a door structure for a vehicle according to the present invention has the following arrangement. More specifically, the lap portion (15) of the front side door (11) or a portion in the vicinity thereof has an engaging portion (41) which engages with the car body externally in the direction of car width, when the front side door (11) is closed, to regulate the front side door (11) from being displaced inwardly in the direction of car width, and the lap portion (15) of the rear side door (12) or a portion in the vicinity thereof has an engaging portion (31) which engages with the car body externally in the direction of car width, when the rear side door (12) is closed, to regulate the rear side door (12) from being displaced inwardly in the direction of car width.

According to the above arrangement, when side collision occurs, the engaging portion engages with the car body. The position of the engaging portion is set at a high-rigidity portion, e.g., in the vicinity of the overlapping portion of the front and rear side doors. Thus, a large displacement of the rear and front side doors into the car compartment is prevented or reduced.

With the above arrangement as a premise, a door structure for a vehicle according to the present invention has the following arrangement. More specifically, the car body has an engaging target portion (38, 49) to engage with the engaging portion (31, 41).

This arrangement is preferable in making engagement of the engaging portion and the car body more firm.

In the above arrangement, the engaging portion (31, 41) and the engaging target portion (38, 49) are fitted with each other. Hence, one of the engaging portion and the engaging target portion can be a projection (31, 41), and the other one of the engaging portion and the engaging target portion can be a hole to fit on the projection (catcher pin structure).

With the above arrangement as a premise, a door structure for a vehicle according to the present invention has the following arrangement. More specifically, a lower end of the opening (1) forms a side sill (2) extending in the back-and-forth direction to serve as a car body strength member, the side sill (2) having the engaging target portion (38, 39) in the vicinity of the lap portion (15), the side sill (2) being formed such that that portion thereof which is in the vicinity of the lap portion (15) partly projects upward, and a retractor (29) for a seat belt (28) is disposed at the partly projecting position of the side sill (2).

This arrangement is preferable in positioning the engaging target portion in the vicinity of that portion of the side sill which is to have a higher rigidity and which is to form an upward projection, so large displacement of the side door into the car compartment is prevented or reduced. This arrangement is also preferable in attaching the retractor to the car body firmly, and in maintaining a space for attaching the retractor.

With the above arrangement as a premise, a door structure for a vehicle according to the present invention has the following arrangement. More specifically, the rear side door (12) is swung about a hinge (14) provided at a rear end thereof as a center to open forward, the front side door (11) is swung about a hinge (13) provided at a front end thereof as a center to open backward, and in an overlapping state, the front end of the rear side door (12) is covered by the rear end of the front side door (11) externally in the direction of car width, so the rear side door (12) can be opened only when the front side door (11) is open.

This arrangement is preferable when the front and rear side doors are to form a so-called double-leafed hinged door-type structure, so when both the front and rear side doors are opened, the car body side portion can be opened very largely. This arrangement is also preferable in preventing the rear side door from being opened carelessly.

With the above arrangement as a premise, a door structure for a vehicle according to the present invention has the following arrangement. More specifically, in a closed state, the rear side door (12) is locked on the car body at the front end thereof, and in the closed state, the front side door (11) is locked on the front end of the rear side door (12).

According to this arrangement, the front side door can be locked on the car body through the rear side door.

With the above arrangement as a premise, a door structure for a vehicle according to the present invention has the following arrangement. More specifically, a lower end of the opening (1) forms a side sill (2), an upper end of the opening (1) forms a side end of a roof panel (3), and in the closed state, the rear side door (12) is locked on the side sill (2) and the side end of the roof panel (3).

This arrangement is preferable when locking the rear side door on the car body at its upper and lower portions, so the locking operation can become firm.

With the above arrangement as a premise, a door structure for a vehicle according to the present invention has the following arrangement. More specifically, the front end of the rear side door (12) is reinforced by a reinforcing member (25) extending long throughout almost an entire length of the rear side door (12) in a vertical direction.

This arrangement is very preferable when remarkably increasing the rigidity of the portion in the vicinity of the lap portion, so the various types of effects described above are achieved more effectively.

With the above arrangement as a premise, a door structure for a vehicle according to the present invention has the following arrangement. More specifically, a front end of the front impact bar (27) is disposed to be higher than the rear end thereof, and a rear end of the rear impact bar (26) is disposed to be higher than the front end thereof, the rear end of the front impact bar (27) and the front end of the rear impact bar (26) are arranged close to each other, and the front end of the front impact bar (27) and the rear end of the rear impact bar (26) are at substantially the same height.

According to the above arrangement, when the door is closed, a large, partition-less opening can be formed in the car body side portion. Also, the strength of the car body side portion can be ensured against an impact which is applied to the car body side portion in the case of side collision or the like.

With the above arrangement as a premise, a door structure for a vehicle according to the present invention has the following arrangement. More specifically, the front impact bar (27) is arranged to be inclined downward to the right from the front end thereof to the rear end thereof, and the rear impact bar (26) is arranged to be inclined upward to the right from the front end thereof to the rear end thereof, so as to form a substantial V shape when seen from the car body side portion.

This arrangement can increase the door rigidity.

With the above arrangement as a premise, a door structure for a vehicle according to the present invention has the following arrangement. More specifically, the front end of the front side door (11) is supported to the car body by a pair of hinges (13) vertically spaced apart from each other by a predetermined distance, and the front end of the front impact bar (27) is attached between the hinges (13).

According to the above arrangement, the front end of the impact bar can be attached to a high-rigidity portion.

With the above arrangement as a premise, a door structure for a vehicle according to the present invention has the following arrangement. More specifically, the rear end of the rear impact bar (26) is attached below a hinge (14) that supports the rear side door (12) at a rear end thereof.

This arrangement can increase the door rigidity below the hinge.

With the above arrangement as a premise, a door structure for a vehicle according to the present invention has the following arrangement. More specifically, the car body side portion has a partition-less opening through which an inner side and outer side of a car compartment communicate with each other when the front side door (11) and rear side door (12) are closed.

According to this arrangement, the front door and rear door can form a double-leafed hinged door-type structure, so the opening of the car body side portion can make the passenger feel more open to the outside and can get on and off the car easily.

With the above arrangement as a premise, a door structure for a vehicle according to the present invention has the following arrangement. More specifically, the rear end of the front side door (11) and the front end of the rear side door (12) have engaging portions (31, 41) that engage with each other when the front side door (11) and the rear side door (12) are closed.

According to this arrangement, the door can be held not to open when an impact is applied to the car body side portion in the case of side collision or the like.

With the above arrangement as a premise, a door structure for a vehicle according to the present invention has the following arrangement. More specifically, the front impact bar (27) and the rear impact bar (26) are disposed below the engaging portions (31, 41).

This arrangement can increase the door rigidity below the engaging portions.

With the above arrangement as a premise, a door structure for a vehicle according to the present invention has the following arrangement. More specifically, a reinforcing member (25) is provided in the front end of the rear side door (12) to extend in the vertical direction of the car body.

This arrangement can ensure the door strength.

With the above arrangement as a premise, a door structure for a vehicle according to the present invention has the following arrangement. More specifically, the front end of the rear impact bar (26) is attached to the reinforcing member (25).

This arrangement, together with the reinforcing member, can increase the door rigidity.

With the above arrangement as a premise, a door structure for a vehicle according to the present invention has the following arrangement. More specifically, a reinforcing member (44) is provided in the front end of the front side door (11) to extend in the vertical direction of the car body, the reinforcing member (44) being provided with an opening degree adjusting member (46) which controls the front side door (11) in a pulsed manner at predetermined opening degrees when the front side door (11) is being opened and closed.

According to this arrangement, the impact bar can be attached to a high-rigidity portion.

Other objects and advantages beside those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 14 is seen from above;

DETAILED DESCRIPTION OF THE PREFERRED EMBODIMENTS

The preferred embodiments of the present invention will be described in detail with reference to the accompanying drawings.

The embodiments to be described hereinafter are merely examples of means that realize the present invention, and the present invention can be applied to those which are obtained by changing or modifying the following embodiments within a scope not departing from the spirit of the invention.

Figure 1:
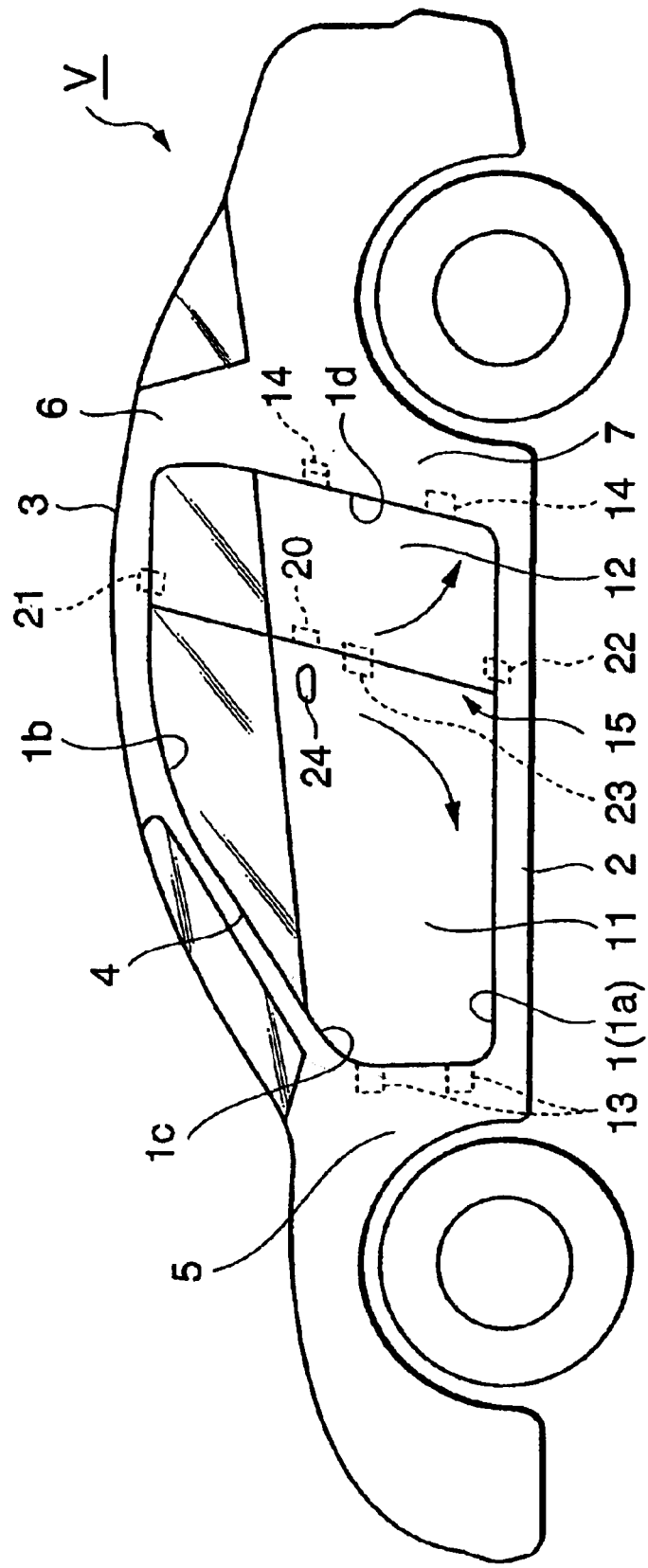
FIG. 1 is a schematic side view showing a vehicle to which the present invention is applied.
Figure 2:
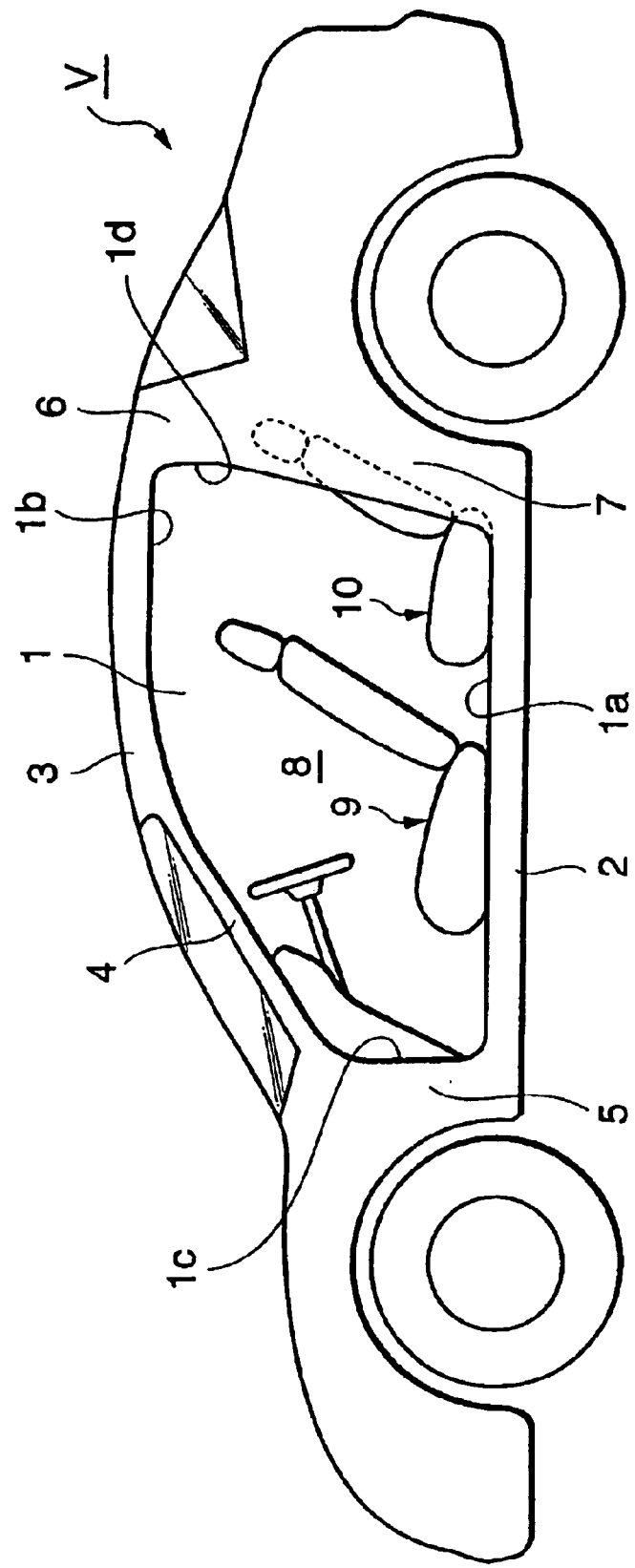
FIG. 2 is a view showing a state obtained by removing the front and rear side doors from FIG. 1.
Figure 3:
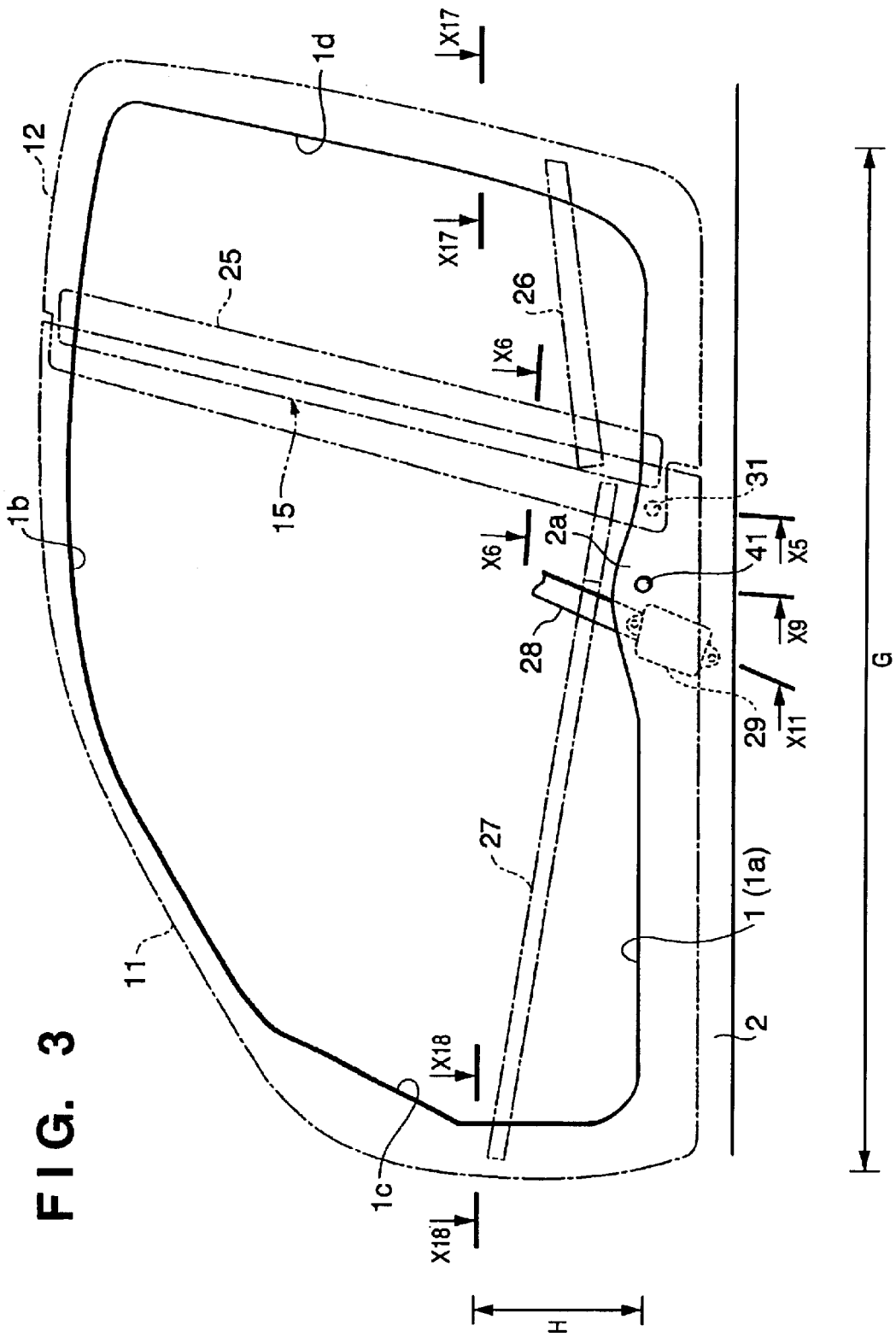
FIG. 3 is an enlarged side view of the main part of FIG. 1 in which the front side door is indicated by an alternate long and short dashed line and the rear side door is indicated by an alternate long and two short dashed line.

(1) Overall Outline (FIGS. 1 to 3)

The overall outline will be described with reference to FIGS. 1 to 3. Significant portions will be described later in detail with reference to other drawings as well. First, a vehicle V has an opening 1 in its car body side portion. The opening 1 is a large (long) one not divided midway by a center pillar but is continuous in the back-and-forth direction. A surrounding rim that defines the opening 1 has the following arrangement. More specifically, a lower end 1a of the front side door 1 is formed of a side sill 2 serving as a car body strength member. An upper end 1b of the opening 1 is formed of a side end (roof reinforcement rail) of a roof panel 3. A front end 1c of the opening 1 is formed of a front pillar 4 and (the rear-side end of) a front fender 5. A rear end 1d of the opening 1 is formed of a rear pillar 6 and (the rear end of) a rear fender 7.

A front seat 9 and rear seat 10 are disposed in a car compartment 8. The opening 1 is opened and closed by a front side door 11 and rear side door 12. The front side door 11 serves as an entrance/exit for the passenger on the rear seat 10, and opens backward as it is swung about hinges 13 provided to its front end as the center (about an axis extending substantially vertically as the center). The rear side door 12 serves as an entrance/exit for the passenger on the rear seat 10, and opens forward as it is swung about hinges 14 provided to its rear end as the center (about an axis extending substantially vertically as the center).

When the front and rear side doors 11 and 12 are closed, they partially overlap each other in the direction of car width, to form a lap portion 15. More specifically, with the rear side door 12 being closed, when the front side door 11 is closed, its rear end overlaps the front end of the rear side door 12 to cover it externally in the direction of car width (this will be described later in detail). Thus, when the front side door 11 is closed, the rear side door 12 cannot be opened as it is interrupted by the front side door 11. The rear side door 12 can be opened provided that the front side door 11 is open.

The front end of the rear side door 12 is locked on the car body at upper and lower portions. More specifically, the upper portion of the rear side door 12 is locked on the roof panel 3 by an upper locking unit 21. The lower portion of the rear side door 12 is locked on the side sill 2 by a lower locking unit 22.

The front side door 11 is locked to the car body through the rear side door 12. More specifically, a substantially middle portion in the vertical direction of the rear end of the front side door 11 is locked on a substantially middle portion in the vertical direction of the front end of the rear side door 12 by a locking unit 23.

When the front side door 11 is to be opened from the outside of the car, a door knob 24 provided to the rear end of the outer surface of the front side door 11 is operated to unlock the locking unit 23. To open the rear side door 12, after the front side door 11 is opened, a door knob 20 provided to the inner side of the car compartment for the rear side door 12 is operated, so the upper locking units 21 and 22 are unlocked. In other words, the rear side door 12 has no door knob that can be directly operated from the outside of the car compartment.

The rear side door 12 integrally has a vertically extending thin reinforcing member 25 at its front end. The reinforcing member 25 extends throughout almost the entire length of the rear side door 12 in the vertical direction to form a closed section. Namely, the reinforcing member 25 is located at the lap portion 15 of the front and rear side doors 11 and 12 or in its vicinity. In other words, when the rear side door 12 is closed, the reinforcing member 25 substantially serves as a center pillar. Hence, when the rear side door 12 is closed, the upper end of the reinforcing member 25 is located immediately close to the side end of the roof panel 3 on the outer side in the direction of car width, and the lower end of the reinforcing member 25 is located immediately near the side sill 2 on the outer side in the direction of car width.

In the rear side door 12, an impact bar 26 serving as a strength member extending in the back-and-forth direction is disposed at a comparatively low position. The impact bar 26 is integrated with the lower end of the reinforcing member 25 by welding or the like as its front end abuts against the lower end of the reinforcing member 25 externally in the direction of car width.

An impact bar 27 serving as a strength member extending in the back-and-forth direction is also disposed in the front side door 11. The rear end of the impact bar 27 is located immediately close to the reinforcing member 25. In this manner, the strength members, e.g., the reinforcing member 25, the front end of the impact bar 26, and the rear end of the impact bar 27, are concentrated at the lap portion 15 of the front and rear side doors 11 and 12, so the rigidity of the lap portion 15 becomes as large as possible.

The impact bars 26 and 27 connect the upper and lower portions of the car body with diagonals, while they extend in the respective doors in the back-and-forth direction of the car body through estimated side collision regions (regions defined as a car body vertical region H and car body back-to-forth region G) of the car body side portion corresponding to almost the heights of the bumpers of other vehicles, so they increase the door rigidity of the corresponding regions.

The impact bars 26 and 27 are made of a steel stock, aluminum, or other materials having a desired strength, and are firmly attached to the inner sides of the rear and front side doors 12 and 11, to ensure the strength of the car body side portion against an impact applied to the car body side portion.

The front end of the impact bar 27 of the front side door 11 is disposed to be higher than the rear end thereof. The rear end of the impact bar 26 of the front side door 11 is disposed to be higher than the front end thereof. The rear end of the impact bar 27 of the front side door 11 and the front end of the impact bar 26 of the rear side door 12 are close to each other. The front end of the impact bar 27 of the front side door 11 and the rear end of the impact bar 26 of the front side door 11 are at almost the same height. The impact bar 27 of the front side door 11 is arranged to be inclined downward to the right from its front end to its rear end, and the impact bar 26 of the rear side door 12 is arranged to be inclined upward to the right from its front end to its rear end, so as to form a substantial V shape when seen from the car body side portion.

With this arrangement, the front and rear side doors 11 and 12 form a double-leafed hinged door type structure, so the passenger can feel sufficiently open to the outside and can get on and off the car easily through the opening 1 in the car body side portion. Also, a high strength can be ensured for the car body side portion against an impact applied to the car body side portion in the case of side collision or the like.

The front end of the impact bar 27 of the front side door 11 is attached between the pair of hinges 13 which support the front side door 11 at its front end and which are vertically spaced apart from each other by a predetermined distance. The rear end of the impact bar 26 of the rear side door 12 is attached below the hinges 14 that support the rear side door 12 at its rear end. The respective impact bars 26 and 27 are disposed below the locking unit 23.

With this arrangement, the impact bar 27 of the front side door 11 is arranged to be inclined downward to the right from its front end to its rear end, and the impact bar 26 of the rear side door 12 is arranged to be inclined upward to the right from its front end to its rear end, so as to form a substantial V shape when seen from the car body side portion. This particularly improves the rigidity of the lower portion of the door.

The front end of the front side door 11 is supported to the car body by the pair of hinges 13 spaced apart from each other by the predetermined distance. The front end of the impact bar 27 is attached between the hinges 13 through a member 6c of a reinforcement 44 (to be described later). Thus, the front end of the impact bar 27 can be attached to a high-rigidity portion.

Regarding the rear end of the impact bar 26 of the rear side door 12, this rear side door 12 is attached below the hinges 14 that support it at its rear end. This can increase the door rigidity below the hinges 14.

When the front and rear side doors 11 and 12 are closed, their rear and front ends, respectively, are engaged with each other by the locking unit 23. When side collision or the like occurs, the doors do not open due to an impact applied to the car body side portion.

The respective impact bars 26 and 27 are disposed below the locking unit 23 to increase the door rigidity below the locking unit 23.

The front end of the impact bar 26 of the rear side door 12 is attached to the reinforcing member 25. This, together with the reinforcing member 25, improves the door rigidity.

That portion of the side sill 2 which is close to the lap portion 15, more specifically, that portion of the side sill 2 which is slightly before the lap portion 15 partly forms an upward projection. This projection is indicated by reference numeral 2a. Since the projection 2a is formed, the side sill 2 at this portion has a larger sectional area than the other portions, to partly increase the rigidity. A retractor 29 for taking up a seat belt 28 for the front seat 9 is fixed in that portion of the side sill 2 which corresponds to the projection 2a. Namely, a space to dispose the retractor 29 and a rigidity to stand a large pulling force applied to the retractor 29 are ensured by forming the projection 2a.

The rear side door 12 has an engaging portion 31 at the lower portion of its front end. The side sill 2 has a recess serving as an engaging target portion to correspond to the engaging portion 31. When the rear side door 12 is closed, the engaging portion 31 engages (fits) with the engaging target portion. This regulates the rear side door 12 from being displaced toward the car compartment 8 when side collision occurs. Similarly, the front side door 11 has an engaging portion 41 at the lower portion of its rear end. The side sill 2 has an engaging target portion to correspond to the engaging portion 41. When the front side door 11 is closed, the engaging portion 41 engages (fits) with the engaging target portion. This regulates the front side door 11 from being displaced toward the car compartment 8 when side collision occurs. The engaging portions 31 and 41 (and the corresponding engaging target portions) will be described later in detail.

(2) Explanation on Rear Side Door (FIGS. 1 to 3, 4 to 7, 17, and 20).

Figure 4:
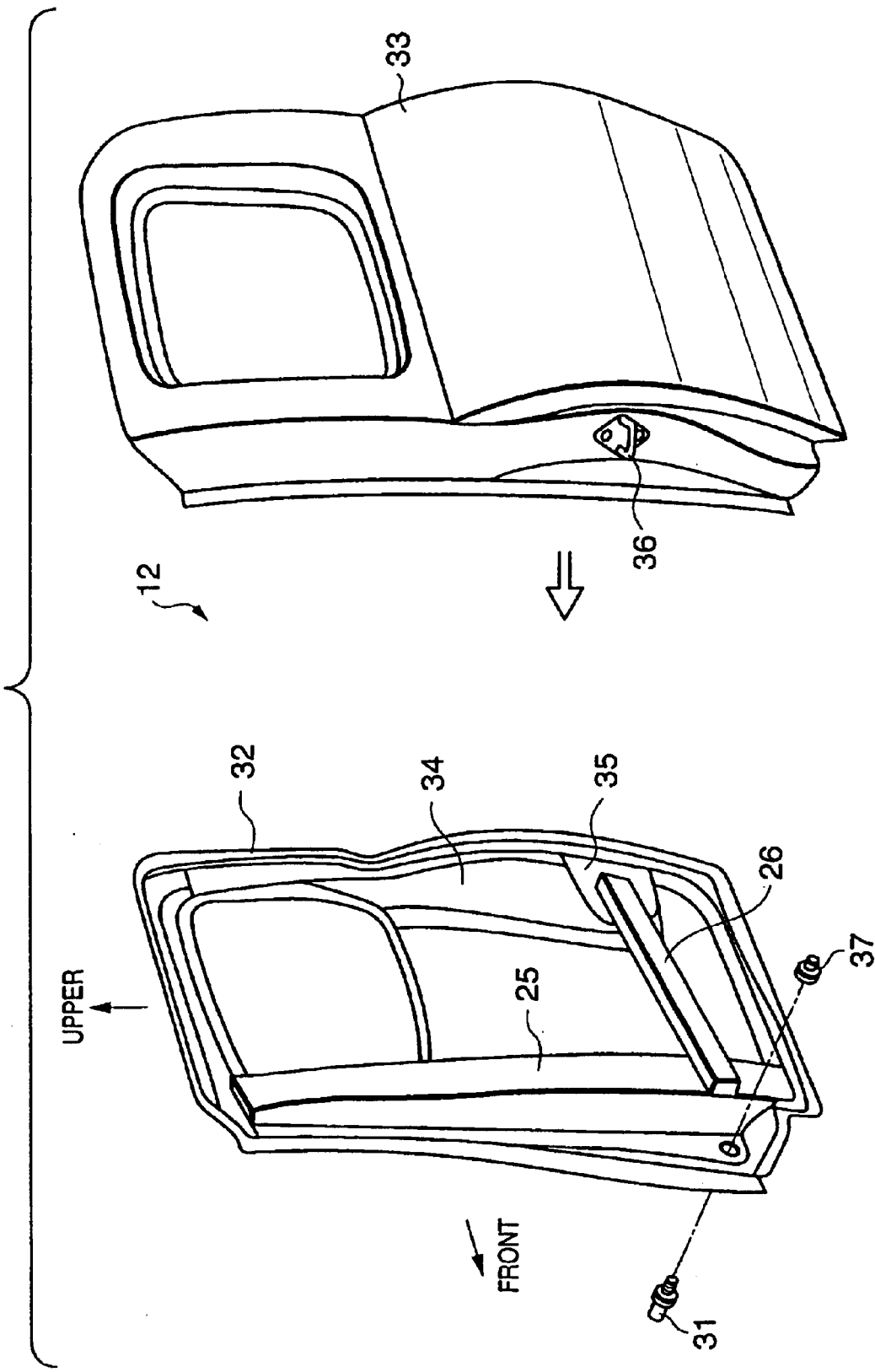
FIG. 4 is an exploded perspective view of the rear side door.
Figure 5:
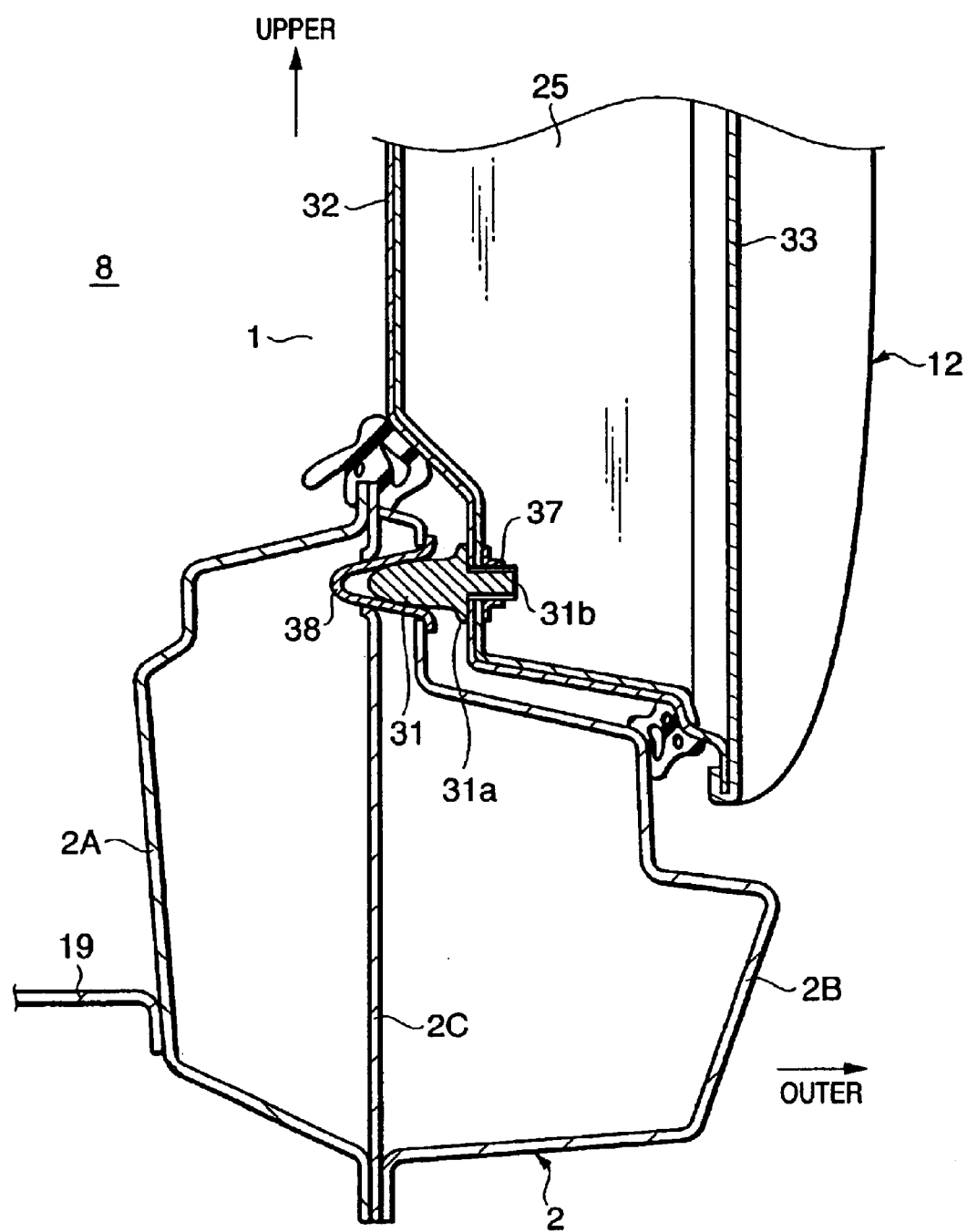
FIG. 5 is a sectional view taken along a portion corresponding to the line X5 of FIG. 3 to show an engaging portion formed on the rear side door.
Figure 6:
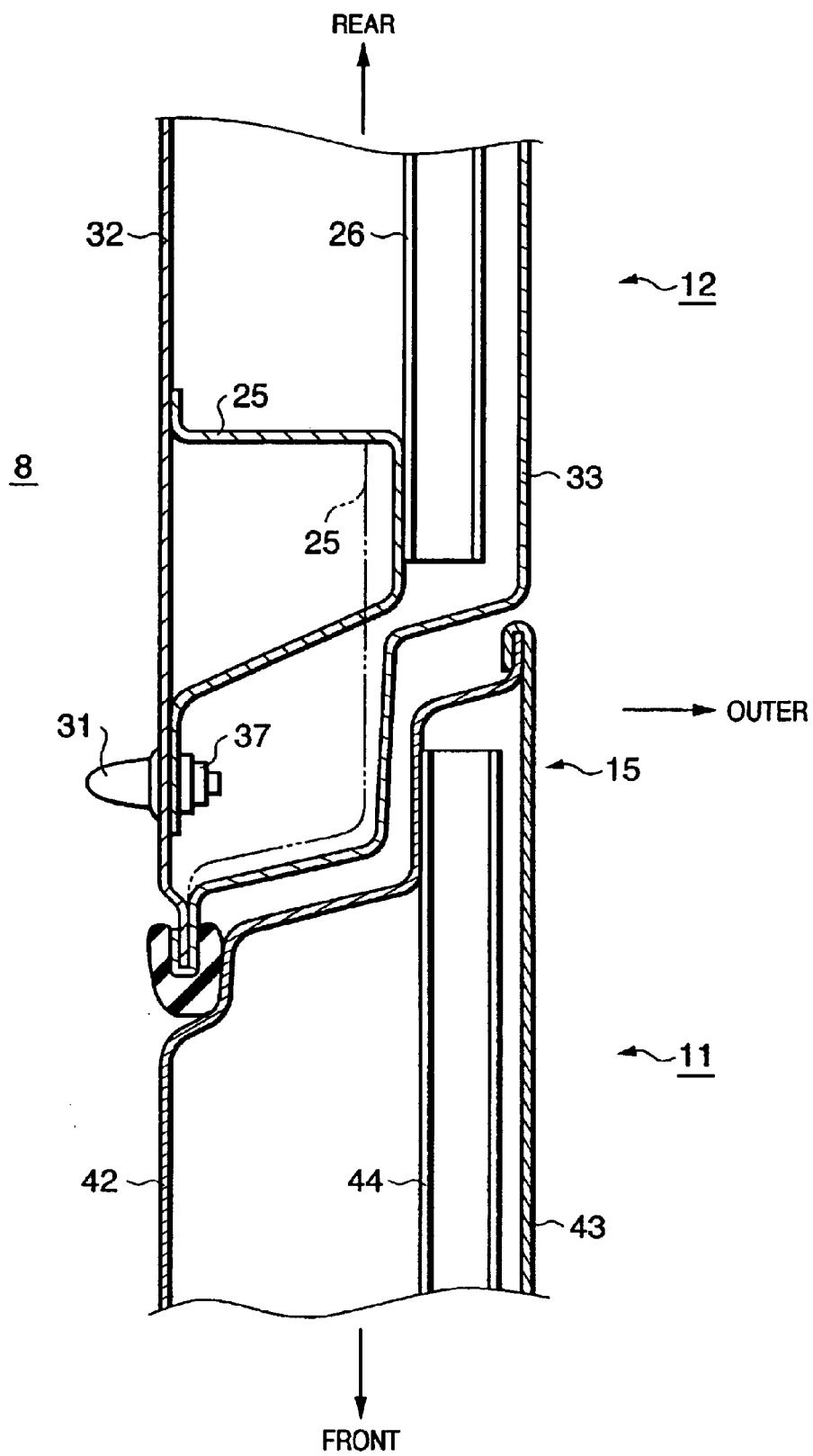
FIG. 6 is a sectional view taken along the line X6—X6 of FIG. 3.
Figure 7:
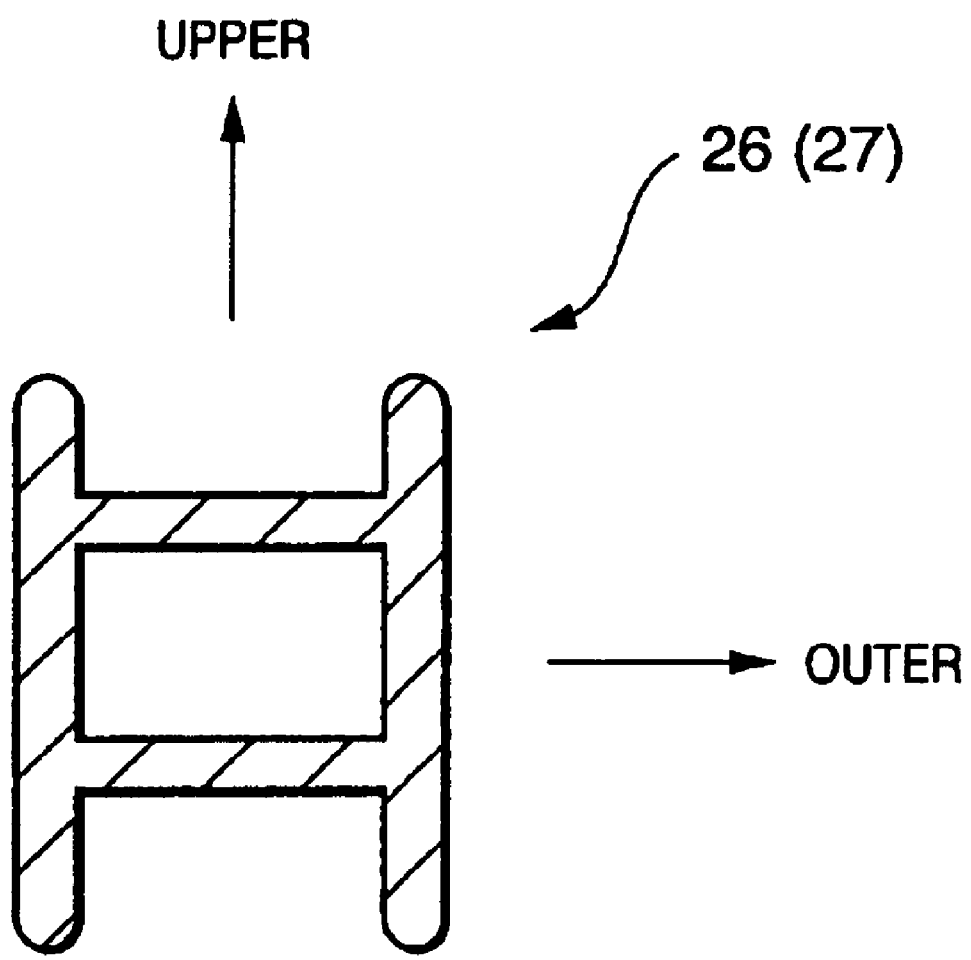
FIG. 7 is a sectional view of an impact bar.

The rear side door 12 will be described in detail. As is already known, the rear side door 12 is formed of an inner panel 32 and outer panel 33 to form a closed section (FIGS. 4 to 6). The inner panel 32 integrally has, on its outer side surface in the direction of car width, the reinforcing member 25 (described above) extending long throughout almost the entire length of the rear side door 12 in the vertical direction. The reinforcing member 25 has a hat-shaped section, and forms a closed section together with the inner panel 32.

Figure 17:
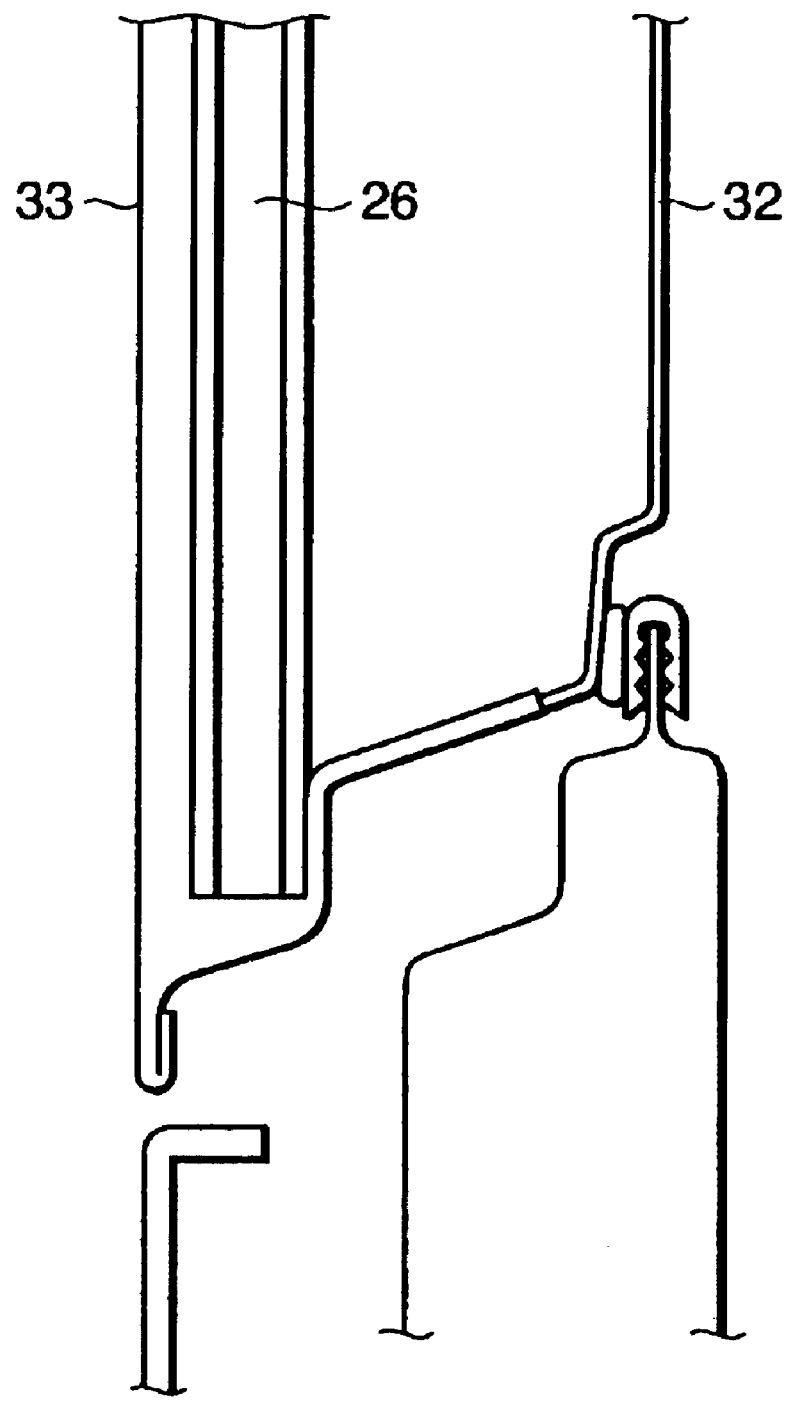
FIG. 17 is a sectional view taken along the line X17 of FIG. 3.

The inner panel 32 integrally has a reinforcement 34 at its rear end. The impact bar 26 described above is disposed astride the reinforcement 34 and reinforcing member 25. More specifically, the impact bar 26 has a sectional shape as shown in, e.g., FIG. 7. The front end of the impact bar 26 is integrated with the lower end of the reinforcing member 25 so as to be located on its outer side in the direction of car width (FIGS. 4, 6, and 17). The rear end of the impact bar 26 is integrated with the reinforcement 34 through a door check (small reinforcing plate) 35. A striker 36 for the locking unit 23 (described above) is fixed to almost the middle portion in the vertical direction of the front end face of the outer panel 33 (FIG. 4).

Figure 20:
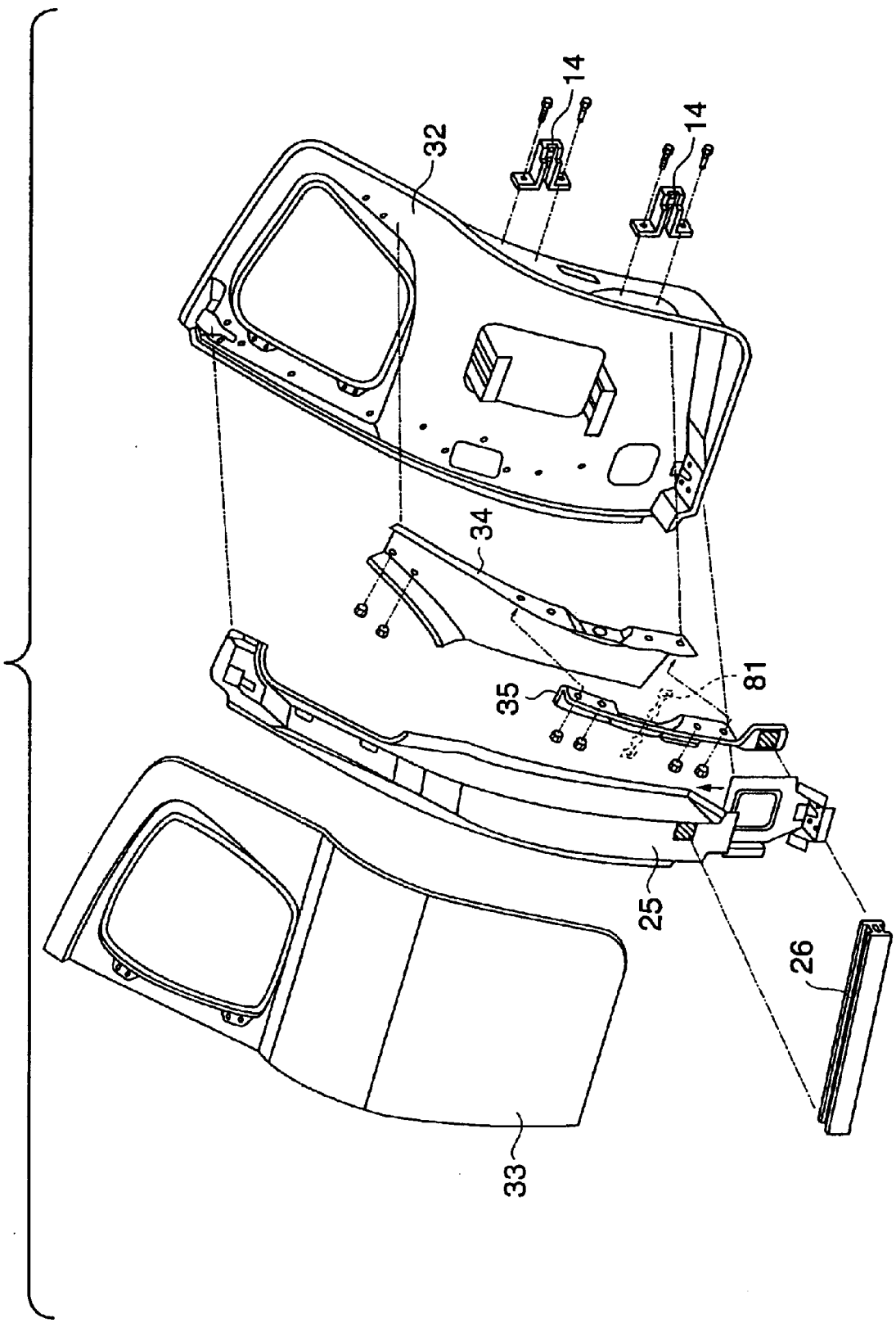
FIG. 20 is an exploded view showing the structure of the rear side door.

The door check 35 of the reinforcement 34 has an opening degree adjusting member 81 which controls to stop the door at predetermined opening degrees when the door is opened (FIG. 20).

The lower portion of the front end of the rear side door 12, more specifically, the thick portion thereof where the inner panel 32 and the flange of the reinforcing member 25 overlap forms the engaging portion 31 (described above). The engaging portion 31 is substantially formed of a pin member serving as a projection projecting inwardly in the direction of car width. The engaging portion 31 formed of the pin member has a flange 31a on its proximal end side, and a male screw 31b on its outer side in the direction of car width with respect to the flange 31a. The male screw 31b extends through the inner panel 32 and the flange of the reinforcing member 25. A lock nut 37 threadably engaging with the male screw 31b and the flange 31a sandwich the inner panel 32 and the flange of the reinforcing member 25. Hence, the engaging portion 31 is fixed.

The side sill 2 has an engaging target portion 38 to correspond to the engaging portion 31. More specifically, as is already known, the side sill 2 is formed of an inner panel 2A, outer panel 2B, and reinforcement 2C to have two closed section structures in the direction of car width. The engaging target portion 38 is fixed astride the outer panel 2B and reinforcement 2C. The engaging target portion 38 is formed of a bottomed cylindrical member extending in the direction of car width, and has a recess or hole which is open to the outer side in the direction of car width. This recess or hole has a diameter which gradually increases toward the outer side in the direction of car width. The engaging target portion 38 is firmly fixed to and held by the side sill 2, so it will not be easily displaced with respect to the side sill 2 inwardly in the direction of car width.

When the rear side door 12 is closed, the engaging portion 31 is fitted in the engaging target portion 38. In the case of side collision, when a large external force acts on the rear side door 12 toward the car compartment 8, the engaging portion 31 is locked by the engaging target portion 38, that is, is caught by the engaging target portion 38, so it will be prevented from being largely displaced with respect to the side sill 2 inwardly in the direction of car width.

(3) Explanation on Front Side Door (FIGS. 1 to 3, 6 to 10, 18, and 19)

The front side door 11 will now be described in detail. As is already known, the front side door 11 is formed of an inner panel 42 and outer panel 43 to have a closed section (FIGS. 6, 8, and 9).

Figure 8:
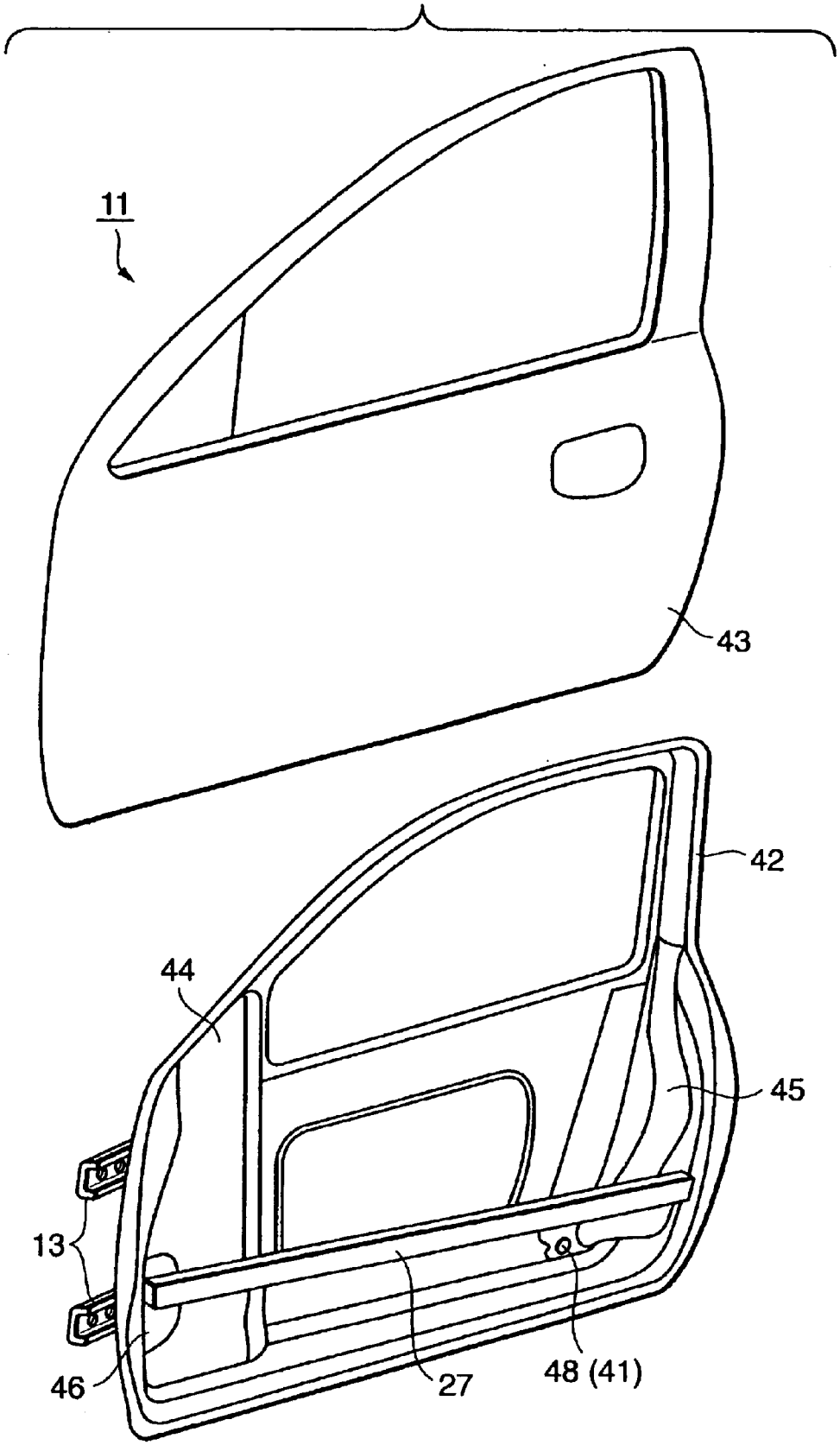
FIG. 8 is an exploded perspective view of the front side door.
Figure 9:
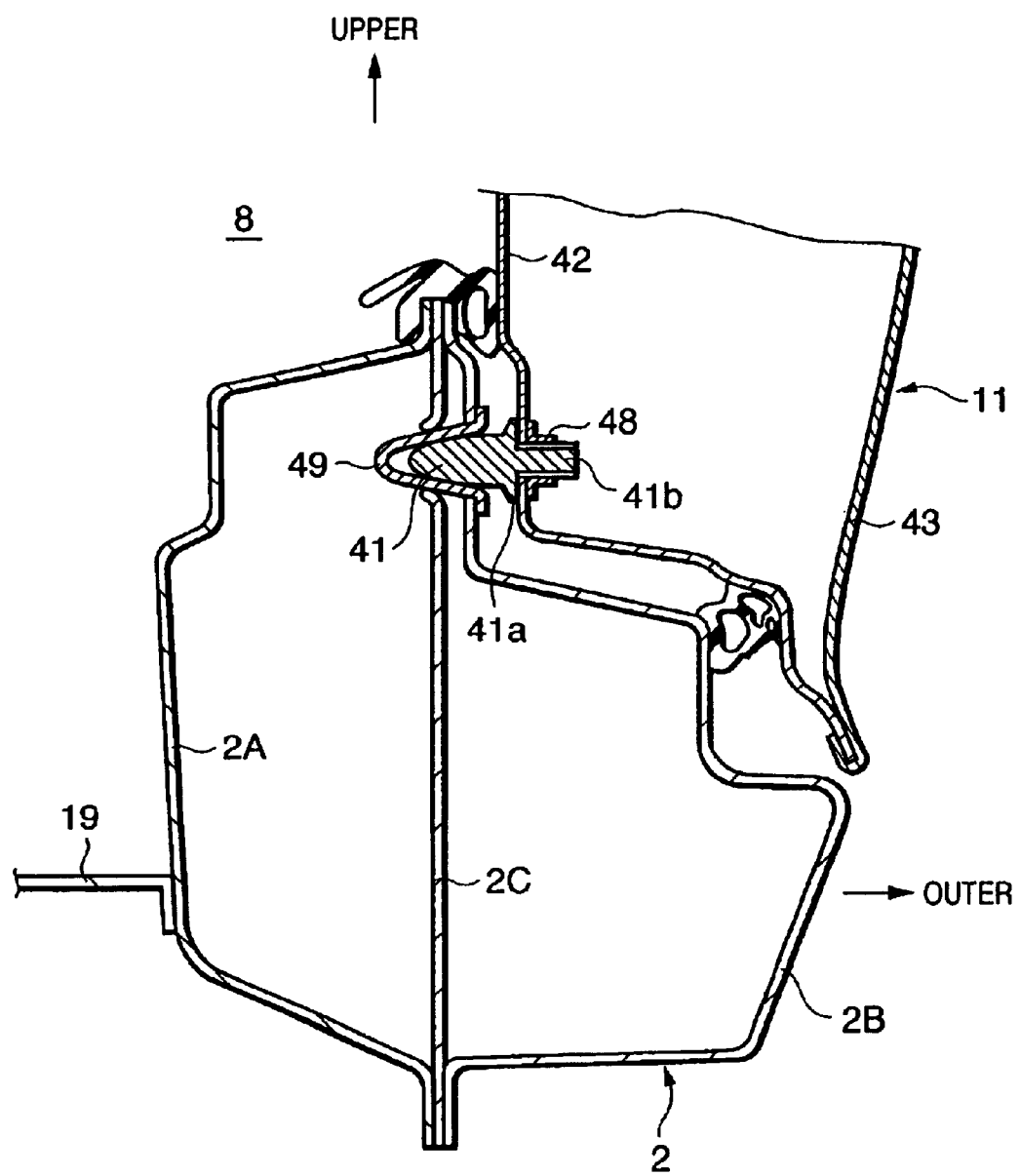
FIG. 9 is a sectional view taken along a portion corresponding to the line X9 of FIG. 3 to show an engaging portion formed on the front side door.
Figure 18:
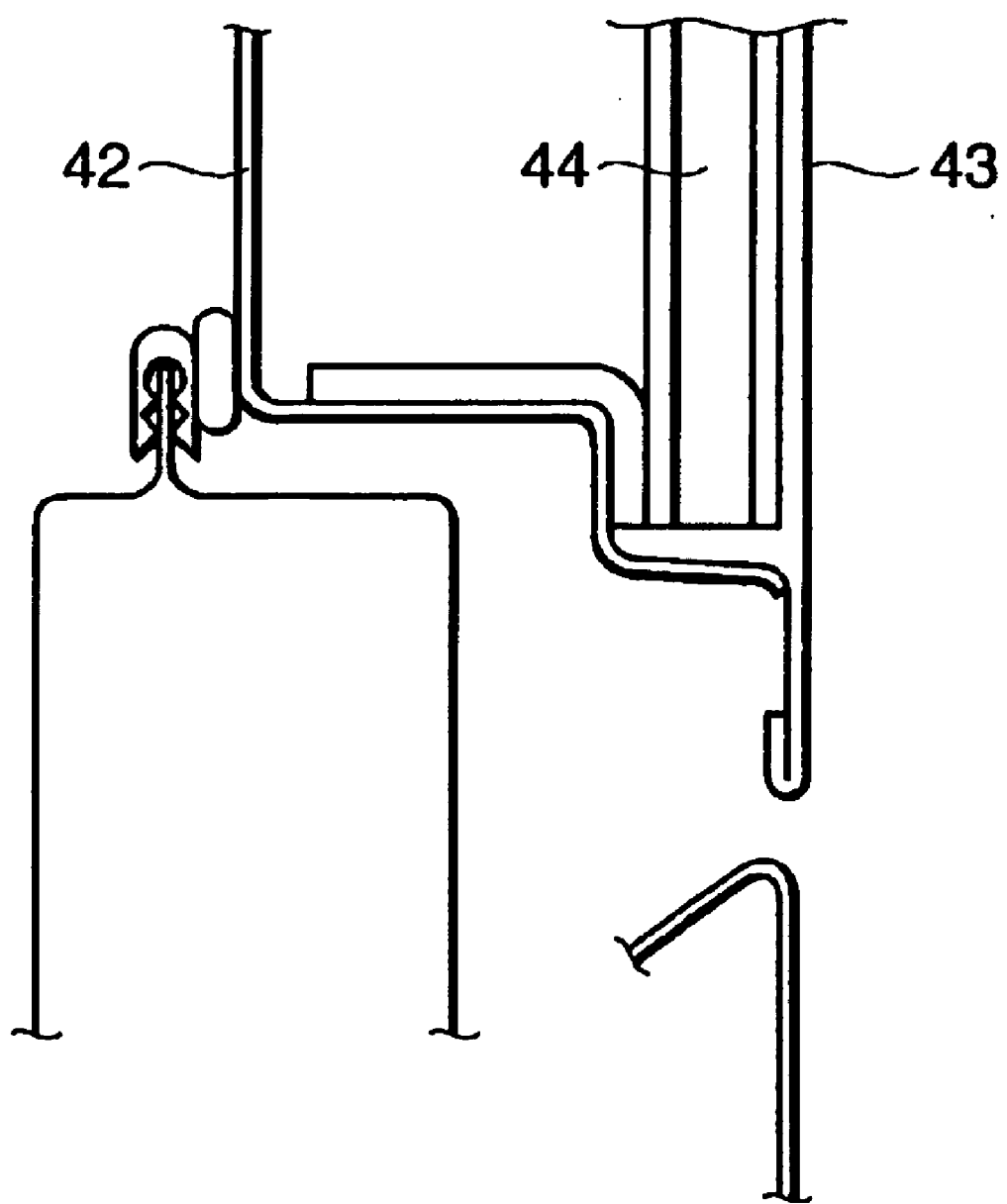
FIG. 18 is a sectional view taken along the line X18 of FIG. 3.

The inner panel 42 integrally has reinforcements 44 and 45 at its front and rear ends, respectively (FIGS. 8 and 18). The impact bar 27 described above is disposed astride the reinforcements 44 and 45. More specifically, the impact bar 27 has a sectional shape as shown in, e.g., FIG. 7. The front end of the impact bar 27 is integrated with the reinforcement 44 through a door check (small reinforcing plate) 46. The rear end of the impact bar 27 is integrated with the reinforcement 45. Although not shown, the locking unit 23 (described above) is provided to almost the middle portion in the vertical direction of the rear end face of the outer panel 43 (this corresponds to the striker 36 of the rear side door 12).

Figure 19:
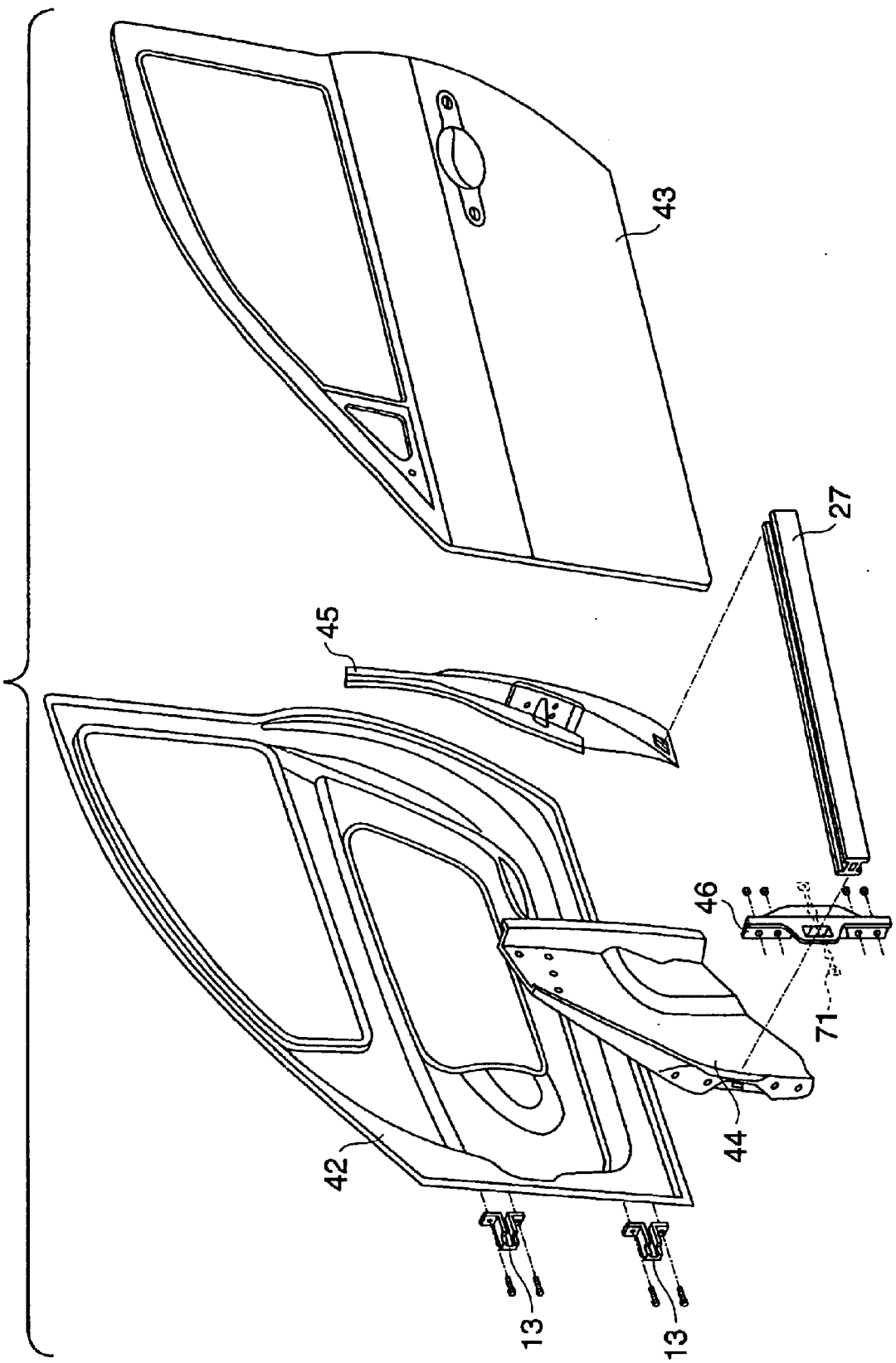
FIG. 19 is an exploded view showing the structure of the front side door.

The door check 46 of the reinforcement 44 has an opening degree adjusting member 71 which controls to stop the door at predetermined opening degrees when the door is being opened (FIG. 19).

The front side door 11 has the engaging portion 41 (described above) at the lower portion of its rear end, more specifically, at a position corresponding to the projection 2a of the side sill 2 (described above) or in its vicinity. The engaging portion 41 is substantially formed of a pin member serving as a projection projecting inwardly in the direction of car width. The engaging portion 41 formed of the pin member has a flange 41a on its proximal end side, and a male screw 41b on its outer side in the direction of car width than the flange 41a. The male screw 41b extends through the inner panel 42. A lock nut 48 threadably engaging with the male screw 41b and the flange 41a sandwich the inner panel 42. Hence, the engaging portion 41 is fixed.

The side sill 2 has an engaging target portion 49 to correspond to the engaging portion 41. More specifically, as shown in FIG. 9, the engaging target portion 49 is fixed astride the outer panel 2B and reinforcement 2C of the side sill 2. The engaging target portion 49 is formed of a bottomed cylindrical member extending in the direction of car width, and has a recess or hole which is open to the outer side in the direction of car width. This recess or hole has a diameter which gradually increases toward the outer side in the direction of car width. The engaging target portion 49 is firmly fixed to and held by the side sill 2, so it will not be easily displaced with respect to the side sill 2 inwardly in the direction of car width.

When the front side door 11 is closed, the engaging portion 41 is fitted in the engaging target portion 49. In the case of side collision, when a large external force acts on the front side door 11 toward the car compartment 8, the engaging portion 41 is locked by the engaging target portion 49, that is, is caught by the engaging target portion 49, so it will be prevented from being largely displaced with respect to the side sill 2 inwardly in the direction of car width.

(4) Explanation on Mutual Relationship Between Front and Rear Side Doors, Their Modification, and Retractor (FIGS. 1 to 3, 6, 10, and 11)

When the front and rear side doors 11 and 12 are closed, the lap portion 15 is formed as shown in FIG. 6, in which the rear end of the front side door 11 is located on the outer side of the front end of the rear side door 12 in the direction of car. At this time, the rear end of the impact bar 27 of the front side door 11 is located close to the lap portion 15. Namely, when seen from the side of the front side door 11, when side collision occurs, its engaging portion 41 and engaging target portion 49 are utilized to regulate its displacement toward the car compartment 8. In addition, the rigidity of the lap portion 15 is high, and the front end of the rear side door 12, particularly the reinforcing member 25 of the rear side door 12, is located is located on the inner side of the impact bar 27 in the direction of car width. This regulates displacement of the front side door 11 toward the car compartment 8 more strongly. Alternatively, the reinforcing member 25 may be formed such that its closed sectional portion is located on an extension of the front impact bar 27 toward the inner side in the direction of car width, as indicated by an alternate long and short dashed line in FIG. 6.

Figure 10:
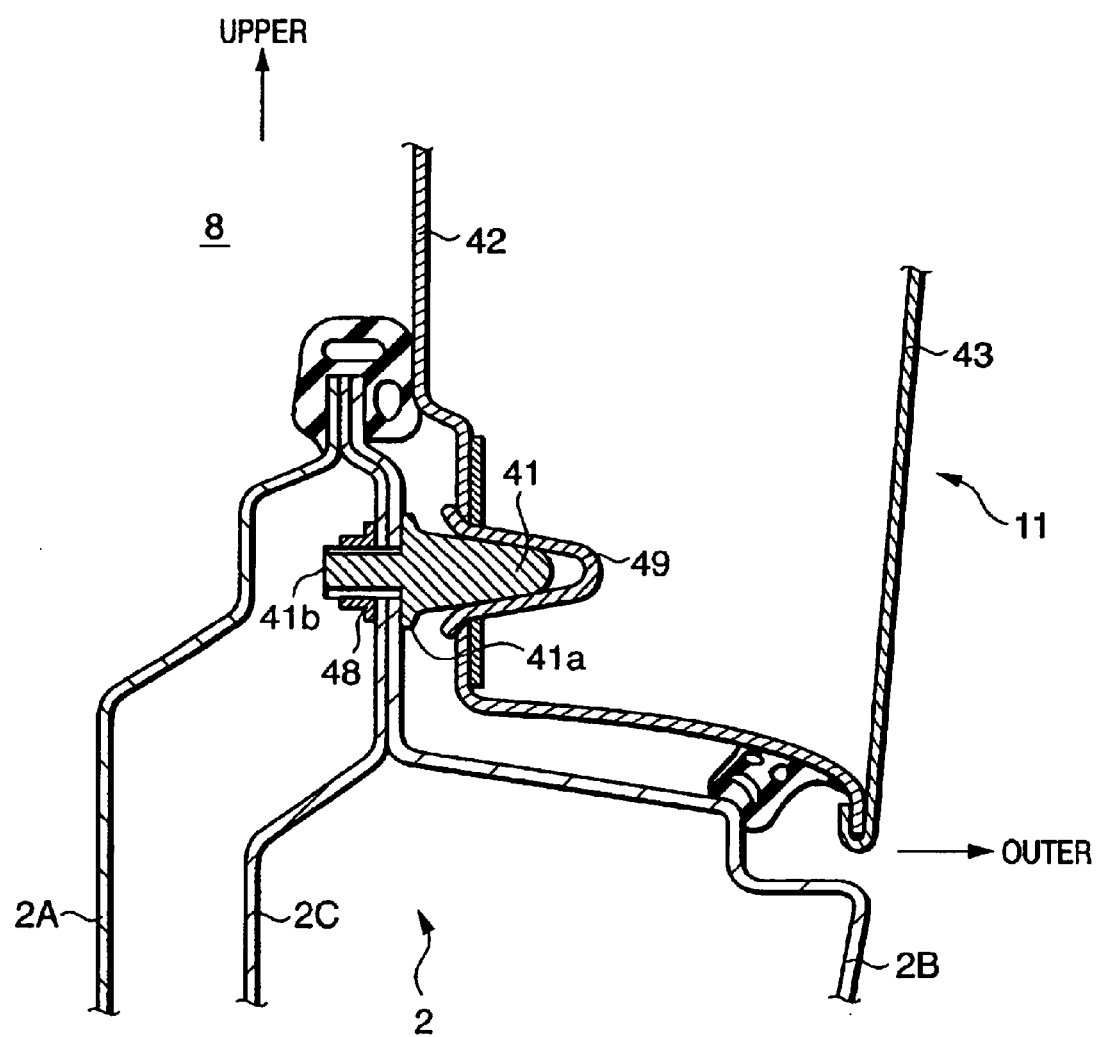
FIG. 10 is a sectional view showing a modification of FIG. 9.

FIG. 10 shows a modification of FIG. 9, and shows a case in which the engaging portion 41 is formed on the side sill 2, while the engaging target portion 49 is formed on the front side door 11. Similarly, although not shown, in the rear side door 12, the engaging portion 31 can be formed on the side sill 2, while the engaging target portion 38 is formed on the rear side door 12.

Figure 11:
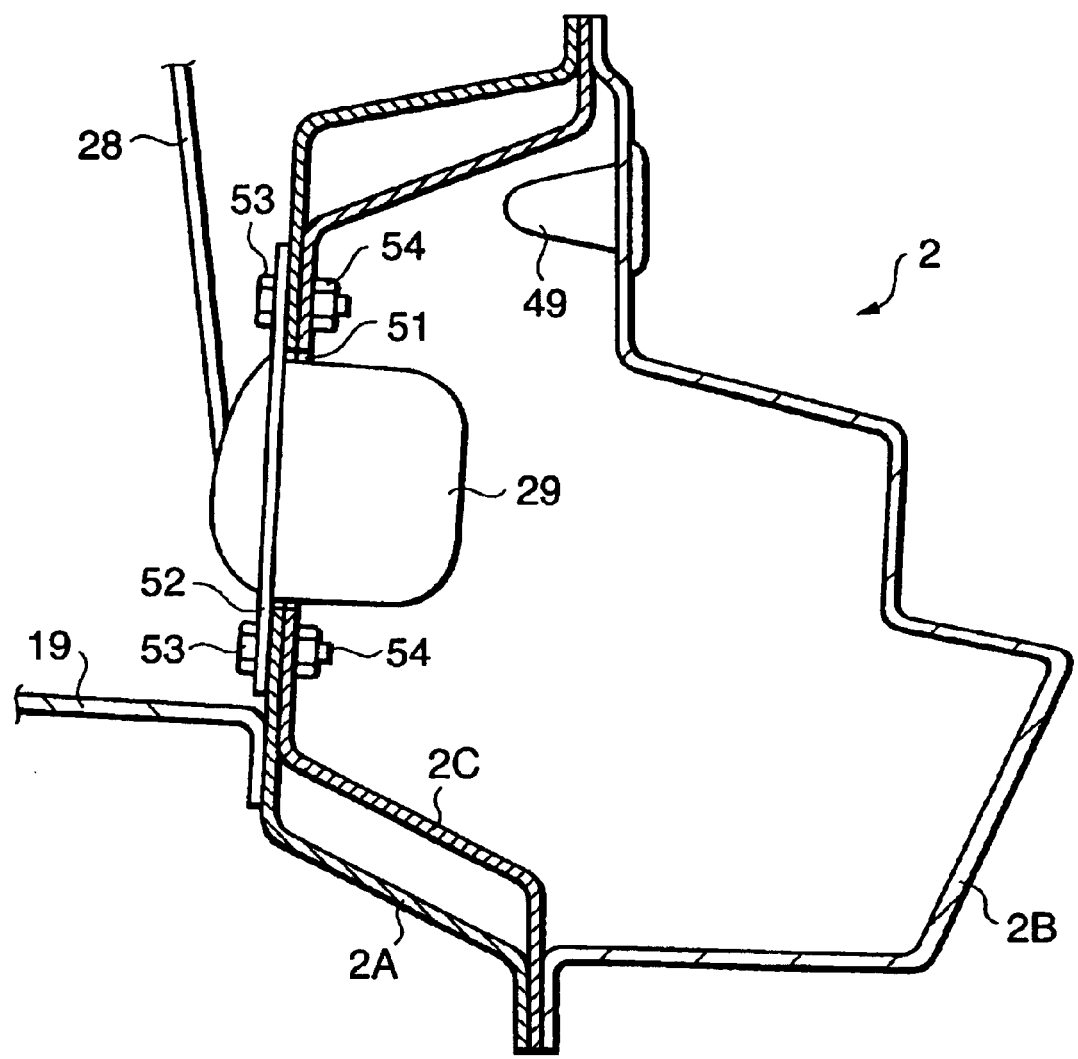
FIG. 11 is a sectional view taken along the line X11 of FIG. 3 to show a retractor formed on the side sill.

FIG. 11 shows a practical example of the retractor 29 (described above) disposed in the side sill 2. More specifically, the retractor 29 is disposed such that the reinforcement 2C of the side sill 2 overlaps the inner panel 2A at a predetermined portion. An attaching opening 51 through which the car compartment 8 and the interior of the side sill 2 communicate with each other is formed in this overlapping portion. The retractor 29 is disposed in the side sill 2 to cover the attaching opening 51. An attaching flange 52 of the retractor 29 is fixed to the overlapping portion of the inner panel 2A and reinforcement 2C by utilizing a bolt 53 and nut 54. In FIGS. 5, 9, and 11, reference numeral 19 denotes a floor panel.

(5) Explanation on Opening/Closing Unit for Rear Side Door (FIGS. 1 and 12 to 16)

Figure 12:
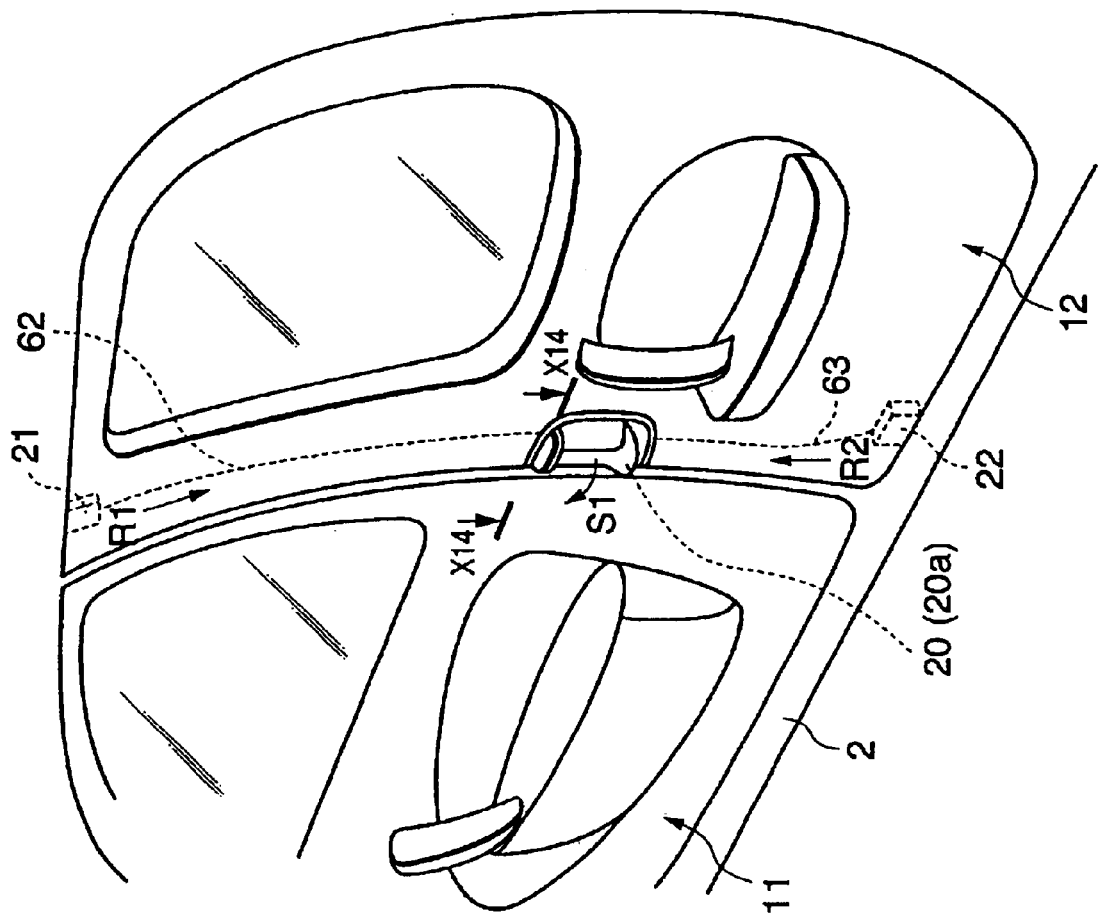
FIG. 12 is a view of a door knob for opening/closing the rear side door when seen from the car compartment side.
Figure 13:
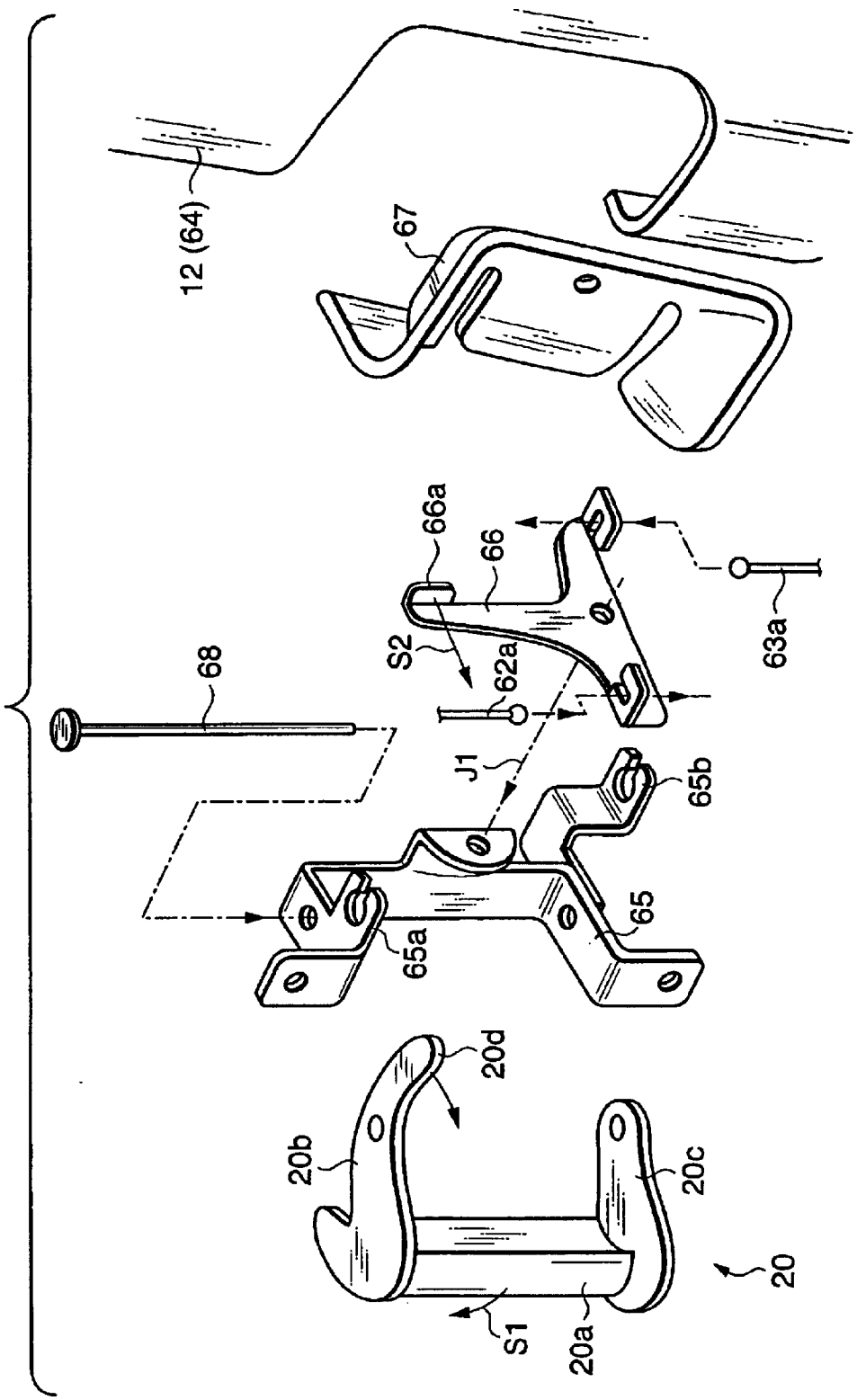
FIG. 13 is an exploded perspective view of a mechanism related to the door knob for opening/closing the rear side door.
Figure 14:
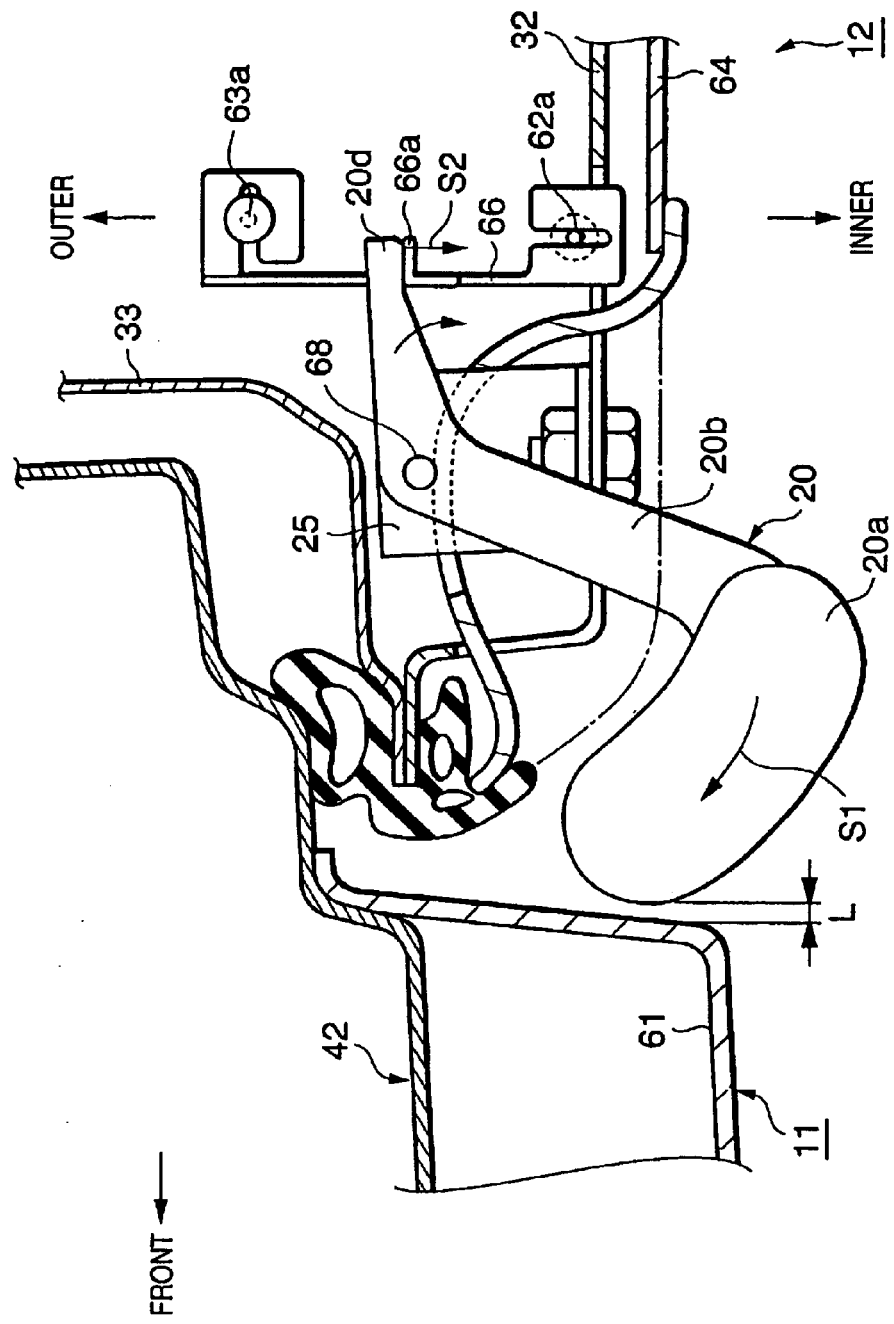
FIG. 14 is a sectional view taken along the line X14 of FIG. 12.
Figure 16:
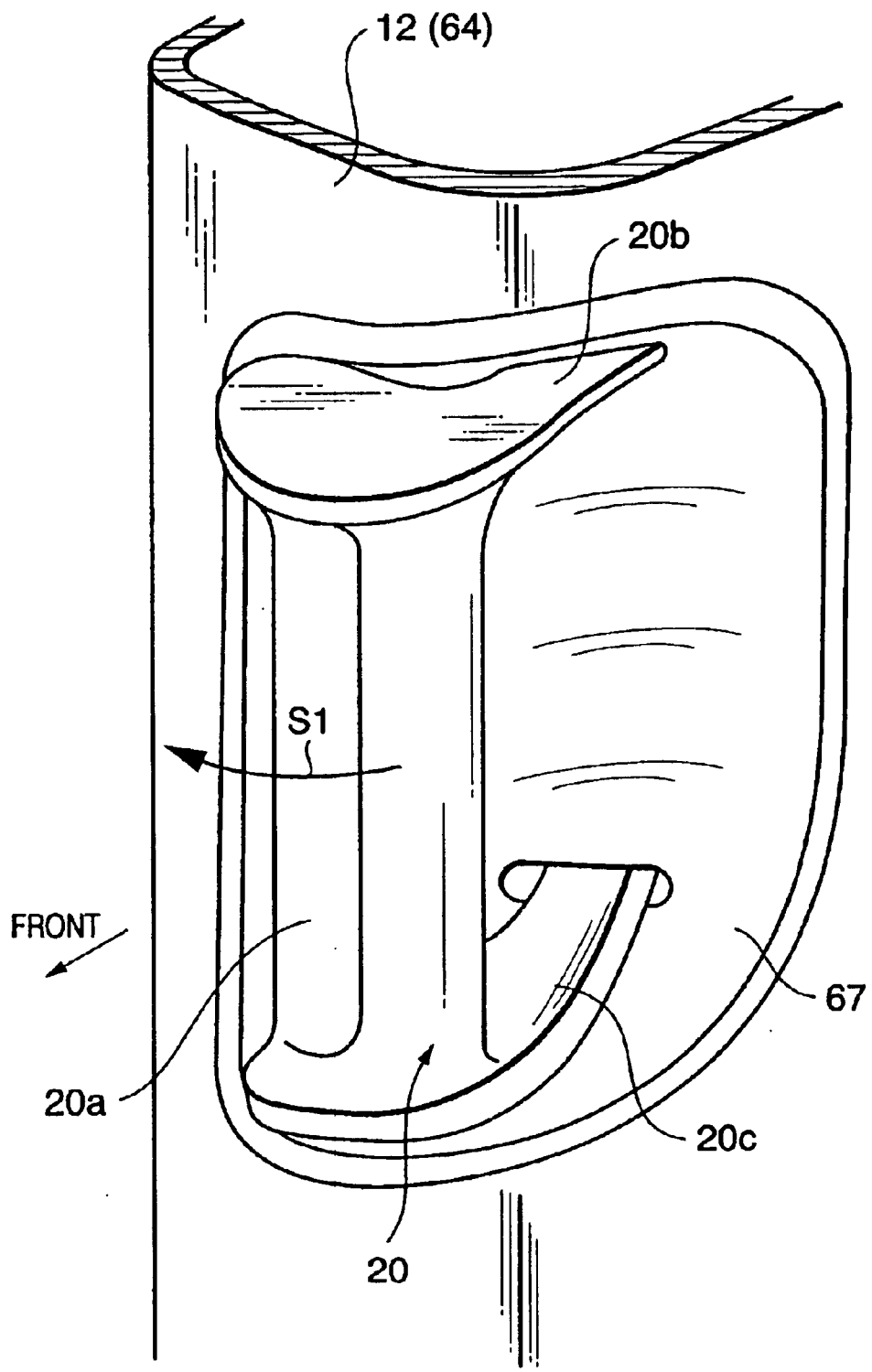
FIG. 16 is an enlarged perspective view of the door knob for opening/closing the rear side door.

A portion related to opening/closing the rear side door 12 by utilizing the door knob 20 will be described. First, as shown in FIGS. 12, 16, and 14, the door knob 20 is formed at substantially the middle position in the vertical direction of the front end of the rear side door 12. More specifically, the door knob 20 is disposed at a corner in the vicinity of the boundary of the inner side surface of the car compartment and the front end face of the rear side door 12. When the front and rear side doors 11 and 12 are closed, the passenger can access the door knob 20 from inside the car compartment, but cannot access (operate) it from outside the car compartment (externally).

When the front side door 11 is closed, the passenger may be able to access the door knob 20 from inside the car compartment but may not be able to operate it. This will be described in more detail. The door knob 20 can swing about a vertically extending axis as the center. Operation to displace an operating portion 20a of the door knob 20 forward, that is, to displace it in a direction indicated by an arrow S1 in FIGS. 13 to 16 corresponds to the operation to unlock the upper locking units 21 and 22 that lock the rear side door 12 to the car body (the door knob 20 is of the pull-handle type).

When the front and rear side doors 11 and 12 are closed and the upper locking units 21 and 22 are locked, the rear end of the front side door 11 is located immediately in front of the door knob 20 (FIGS. 12 and 14). In this embodiment, a rigid trim member 61 of the closed front side door 11 is located immediately in front of the door knob 20, so a gap L between the trim member 61 and door knob 20 becomes very small. Namely, even when the door knob 20 is displaced in the direction of the arrow S1 by a distance corresponding to the small gap L, the displacement amount of the door knob 20 is not sufficient for unlocking the upper locking units 21 and 22. The member of the front side door 11 that forms the gap L is not limited to the trim member 61. For example, the inner panel 42 or any other appropriate member can be used as far as it reliably has a rigidity that can resist the force of displacing the door knob 20 in the direction of the arrow S1.

The relationship between the door knob 20 and the upper and lower locking units 21 and 22 for locking the rear side door 12 to the car body will be described. First, the upper locking unit 21 is connected to the door knob 20 through a double-structure cable 62, as will be described later. When an inner cable 62a of the cable 62 is pulled downward (pilled in the direction of an arrow R1 in FIGS. 12 and 15), the upper locking unit 21 is unlocked. Similarly, the lower locking unit 22 is connected to the door knob 20 through a double-structure cable 63, as will be described later. When an inner cable 63a of the cable 63 is pulled downward (pulled in the direction of an arrow R2 in FIGS. 12 and 15), the lower locking unit 22 is unlocked.

An attaching board 65 and swing lever 66 are used to connect the door knob 20 and the upper and lower locking units 21 and 22 to each other. The board 65 and swing lever 66 are located on the outer side of a trim member 64 of the rear side door 12 in the direction of car width, and is partitioned from the operating portion 20a of the door knob 20 by a cover member 67 attached to the trim member 64. The board 65 is fixed to the inner panel 32 at upper and lower portions with bolts. The swing lever 66 is attached to the board 65 at its middle portion to be swingable about an axis J1, extending substantially horizontally, as the center.

One end of the swing lever 66 is connected to the inner cable 62a of the cable 62, and an outer cable 62b of the cable 62 engages with a locking portion 65a of the board 65 to be held by it. The other end of the swing lever 66 is connected to the inner cable 63a of the cable 63 described above, and an outer cable 63b of the cable 63 engages with a locking portion 65b of the board 65 to be held by it. Hence, when the swing lever 66 is swung as indicated by an arrow S2 in FIGS. 13 to 15, the inner cables 62a and 63a are pulled to unlock the locking units 21 and 22.

The door knob 20 has a pair of upper and lower legs 20b and 20c extending substantially horizontally, and the leg 20b further has a long pressing piece 20d. The legs 20b and 20c extend through the cover member 67 to the outside in the direction of car width. The door knob 20 is attached at its legs 20b and 20c with an attaching pin 68 extending in the vertical direction, to be swingable about an axis extending substantially in the vertical direction with respect to the board 65 as the center.

Figure 15:
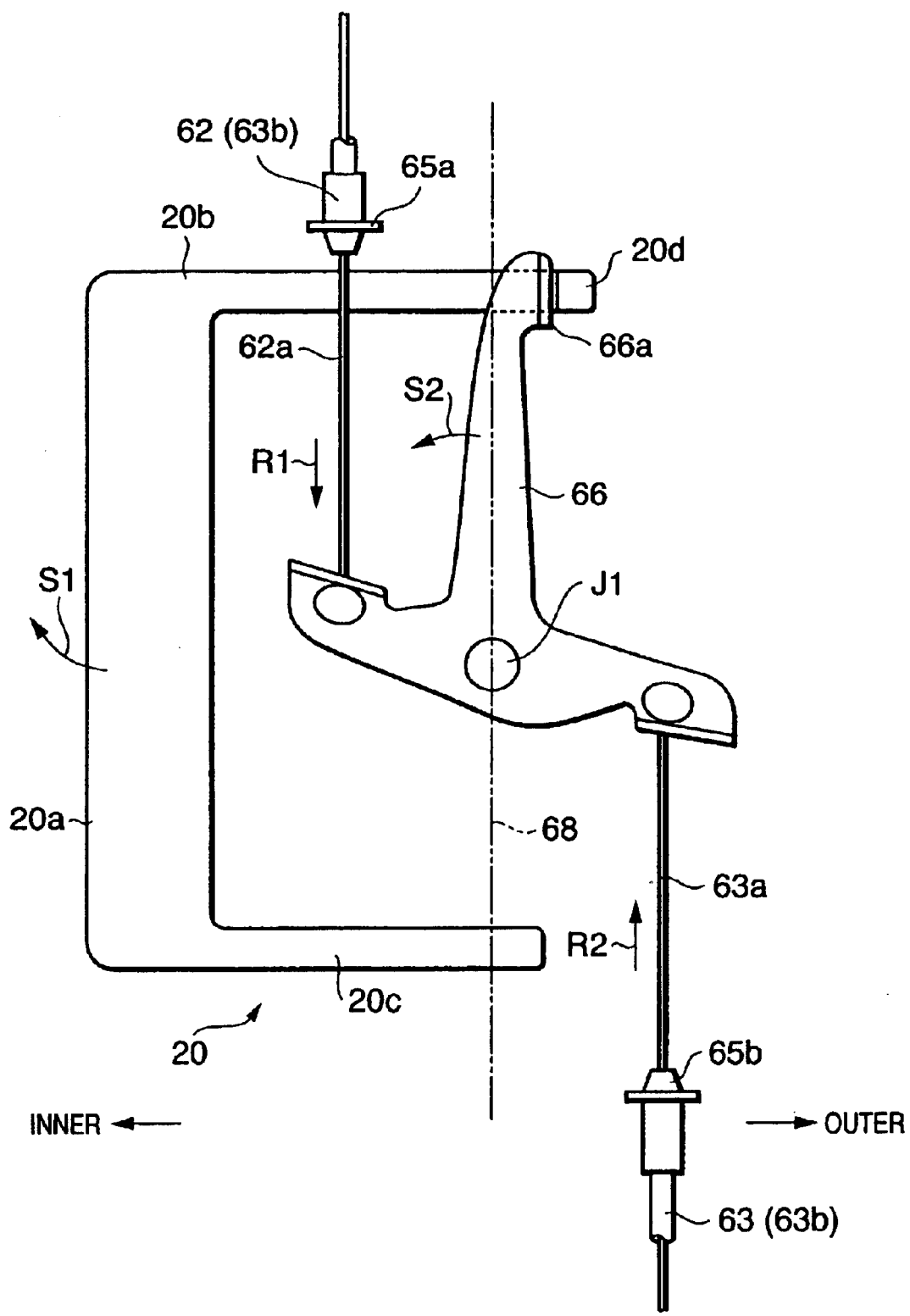
FIG. 15 is a view showing the relationship among the door knob, a swing lever, and a connection cable, and corresponding to a view obtained when

The pressing piece 20d of the door knob 20 opposes a pressing target portion 66a formed on the swing lever 66 to be able to abut against it (FIGS. 14 and 15). When the operating portion 20a of the door knob 20 is largely displaced forward (arrow S1), the pressing piece 20d of the door knob 20 presses the pressing target portion 66a of the swing lever 66, so the swing lever 66 swings in the direction of the arrow S2. Hence, the upper and lower locking units 21 and 22 are unlocked.

The present invention is not limited to the above embodiments and various changes and modifications can be made within the spirit and scope of the present invention. Therefore, to apprise the public of the scope of the present invention the following claims are made.

What is claimed is:

1. A door structure for a vehicle, in which one opening formed in a car body side portion and continuous in a back-and-forth direction is opened and closed by a front side door and rear side door, and a rear end of the front side door and a front end of the rear side door are arranged close to each other when the front and rear side doors are closed, the door structure comprising:

a door knob disposed at an inner side surface of a car compartment of the front end of the rear side door to unlock the rear side door which is locked to the car body, and a restriction portion disposed at the rear end of the front side door to restrict a movement of the door knob in a direction of the unlock when the front and rear side doors are closed.

2. The door structure according to claim 1, wherein the rear end of the front side door overlaps the front end of the rear side door externally in a direction of car width when the front and rear side doors are closed.

3. The door structure according to claim 2, wherein the rear side door is swung about a hinge provided at a rear end thereof as a center to open forward, the front side door is swung about a hinge provided at a front end thereof as a center to open backward, and the rear side door is allowed to open on a condition that the front side door is open.

4. The door structure according to claim 3, wherein the door knob is mounted on the rear side door to be swingable about an axis extending substantially in a vertical direction as a center, and a swing movement of the door knob in a direction to unlock includes at least a movement in a direction to a front of the car body.

5. The door structure according to claim 1, wherein the door knob is movable in a direction to a front of the car body for an unlock operation, and a part of the rear end of the front side door is located as the restriction portion immediately in front of the door knob.

6. The door structure according to claim 5, wherein a recess portion is formed to the front end of the rear side door throughout the front end thereof and a side surface of the rear side door facing to the car compartment, the door knob is located in the recess portion, and a front portion of the recess portion is covered by the front side door which is in a closed sate, so the door knob is restricted to move in a front direction of the car for unlocking.

7. The door structure according to claim 1, wherein in a closed state, the rear side door is locked on the car body at the front end thereof, and in the closed state, the front side door is locked on the front end of the rear side door.

8. The door structure according to claim 7, wherein a lower end of the opening forms a side sill, an upper end of the opening forms a side end of a roof panel, and in the closed state, the rear side door is locked on the side sill and the side end of the roof panel.

9. The door structure according to claim 8, wherein the front end of the rear side door is reinforced by a reinforcing member extending throughout almost an entire length of the rear side door in a vertical direction.

* * * * *

UNITED STATES PATENT AND TRADEMARK OFFICE
CERTIFICATE OF CORRECTION

PATENT NO.   : 6,779,831 B2
DATED        : August 20, 2004
INVENTOR(S)  : Yukihiro Moriyama It is certified that error appears in the above-identified patent and that said Letters Patent is hereby corrected as shown below:

Column 14,
Line 4, delete "is located" (second occurrence).

Column 15,
Line 12, change "pilled" to -- pulled --.

Column 16,
Line 45, change "sate" to -- state --

Signed and Sealed this

Twenty-fourth Day of May, 2005

JON W. DUDAS
*Director of the United States Patent and Trademark Office*